(12) United States Patent
Yun et al.

(10) Patent No.: US 11,143,605 B2
(45) Date of Patent: Oct. 12, 2021

(54) SYSTEM AND METHOD FOR COMPUTED LAMINOGRAPHY X-RAY FLUORESCENCE IMAGING

(71) Applicant: Sigray, Inc., Concord, CA (US)

(72) Inventors: Wenbing Yun, Walnut Creek, CA (US); Sylvia Jia Yun Lewis, San Francisco, CA (US); Janos Kirz, Berkeley, CA (US); Benjamin Donald Stripe, Walnut Creek, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 17/009,500

(22) Filed: Sep. 1, 2020

(65) Prior Publication Data

US 2021/0080408 A1     Mar. 18, 2021

Related U.S. Application Data

(60) Provisional application No. 62/895,342, filed on Sep. 3, 2019.

(51) Int. Cl.
*G01N 23/22*     (2018.01)
*G01N 23/2204*   (2018.01)
(Continued)

(52) U.S. Cl.
CPC ......... *G01N 23/223* (2013.01); *G01N 23/207* (2013.01); *G01N 23/20016* (2013.01); *G01N 23/20025* (2013.01); *G01N 23/2055* (2013.01); *G01N 23/22* (2013.01); *G01N 23/2204* (2013.01); *G01N 23/2209* (2018.02); *G01N 2223/3306* (2013.01); *G01N 2223/607* (2013.01); *G01N 2223/61* (2013.01)

(58) Field of Classification Search
CPC ............... G01N 23/22; G01N 23/2204; G01N 23/2209; G01N 23/223
USPC ....................................... 378/44–50
See application file for complete search history.

(56) References Cited

U.S. PATENT DOCUMENTS 4,642,811 A   2/1987   Georgopoulos
4,945,552 A   7/1990   Ueda
(Continued)

FOREIGN PATENT DOCUMENTS

CN   101257851 B   9/2008
CN   101532969 B   9/2009
(Continued)

OTHER PUBLICATIONS

Momose et al., "X-ray Talbot Interferometry with Capillary Plates", Jpn. J. Appl. Phys. vol. 45 (2006), pp. 314-316.
(Continued)

*Primary Examiner* — Allen C. Ho
(74) *Attorney, Agent, or Firm* — Knobbe, Martens, Olson & Bear, LLP

(57) ABSTRACT

A system and a method use x-ray fluorescence to analyze a specimen by illuminating a specimen with an incident x-ray beam having a near-grazing incident angle relative to a surface of the specimen and while the specimen has different rotational orientations relative to the incident x-ray beam. Fluorescence x-rays generated by the specimen in response to the incident x-ray beam are collected while the specimen has the different rotational orientations.

22 Claims, 11 Drawing Sheets

(51) Int. Cl.
  *G01N 23/2209*  (2018.01)
  *G01N 23/223*  (2006.01)
  *G01N 23/207*  (2018.01)
  *G01N 23/20016*  (2018.01)
  *G01N 23/20025*  (2018.01)
  *G01N 23/2055*  (2018.01)

(56) References Cited

U.S. PATENT DOCUMENTS

| | | | |
|---|---|---|---|
| 5,132,997 A | 7/1992 | Kojima | |
| 5,173,928 A | 12/1992 | Momose et al. | |
| 5,204,887 A | 4/1993 | Hayashida et al. | |
| 5,220,591 A * | 6/1993 | Ohsugi | G01N 23/2206 378/44 |
| 5,249,216 A * | 9/1993 | Ohsugi | G01N 23/2206 378/44 |
| 5,280,176 A * | 1/1994 | Jach | G01B 15/02 250/305 |
| 5,684,857 A * | 11/1997 | De Bokx | G01N 23/2076 378/45 |
| 5,778,039 A | 7/1998 | Hossain | |
| 5,812,629 A | 9/1998 | Clauser | |
| 5,832,052 A | 11/1998 | Hirose et al. | |
| 5,912,940 A | 6/1999 | O'Hara | |
| 6,108,398 A | 8/2000 | Mazor et al. | |
| 6,181,773 B1 | 1/2001 | Lee et al. | |
| 6,195,410 B1 | 2/2001 | Cash, Jr. | |
| 6,226,347 B1 | 5/2001 | Golenhofen | |
| 6,381,303 B1 | 4/2002 | Vu et al. | |
| 6,430,254 B2 | 8/2002 | Wilkins | |
| 6,442,231 B1 | 8/2002 | O'Hara | |
| 6,456,688 B1 | 9/2002 | Taguchi et al. | |
| 6,504,902 B2 | 1/2003 | Iwasaki et al. | |
| 6,611,577 B1 * | 8/2003 | Yamagami | G01N 23/223 378/207 |
| 6,711,234 B1 | 3/2004 | Loxley et al. | |
| 6,763,086 B2 | 7/2004 | Platonov | |
| 6,829,327 B1 | 12/2004 | Chen | |
| 6,891,627 B1 | 5/2005 | Levy et al. | |
| 6,914,723 B2 | 7/2005 | Yun et al. | |
| 6,934,359 B2 | 8/2005 | Chen | |
| 7,006,596 B1 | 2/2006 | Janik | |
| 7,023,955 B2 | 4/2006 | Chen et al. | |
| 7,095,822 B1 | 8/2006 | Yun | |
| 7,119,953 B2 | 10/2006 | Yun et al. | |
| 7,120,228 B2 | 10/2006 | Yokhin et al. | |
| 7,180,979 B2 | 2/2007 | Momose | |
| 7,183,547 B2 | 2/2007 | Yun et al. | |
| 7,187,751 B2 * | 3/2007 | Kawahara | G01N 23/223 378/45 |
| 7,215,736 B1 | 5/2007 | Wang et al. | |
| 7,218,703 B2 | 5/2007 | Yada et al. | |
| 7,221,731 B2 | 5/2007 | Yada et al. | |
| 7,245,696 B2 | 7/2007 | Yun et al. | |
| 7,268,945 B2 | 9/2007 | Yun et al. | |
| 7,388,942 B2 | 6/2008 | Wang et al. | |
| 7,394,890 B1 | 7/2008 | Wang et al. | |
| 7,400,704 B1 | 7/2008 | Yun et al. | |
| 7,406,151 B1 | 7/2008 | Yun | |
| 7,414,787 B2 | 8/2008 | Yun et al. | |
| 7,463,712 B2 | 12/2008 | Zhu et al. | |
| 7,486,770 B2 | 2/2009 | Baumann | |
| 7,492,871 B2 | 2/2009 | Popescu | |
| 7,499,521 B2 | 3/2009 | Wang et al. | |
| 7,515,684 B2 | 4/2009 | Gibson et al. | |
| 7,522,698 B2 | 4/2009 | Popescu | |
| 7,522,708 B2 | 4/2009 | Heismann | |
| 7,532,704 B2 | 5/2009 | Hempel | |
| 7,551,719 B2 | 6/2009 | Yokhin et al. | |
| 7,551,722 B2 | 6/2009 | Ohshima et al. | |
| 7,561,662 B2 | 7/2009 | Wang et al. | |
| 7,564,941 B2 | 7/2009 | Baumann | |
| 7,639,786 B2 | 12/2009 | Baumann | |
| 7,646,843 B2 | 1/2010 | Popescu et al. | |
| 7,653,177 B2 | 1/2010 | Baumann et al. | |
| 7,680,243 B2 | 3/2010 | Yokhin et al. | |
| 7,787,588 B1 | 8/2010 | Yun et al. | |
| 7,796,725 B1 | 9/2010 | Yun et al. | |
| 7,796,726 B1 | 9/2010 | Gendreau et al. | |
| 7,809,113 B2 | 10/2010 | Aoki et al. | |
| 7,813,475 B1 | 10/2010 | Wu et al. | |
| 7,817,777 B2 | 10/2010 | Baumann et al. | |
| 7,848,483 B2 * | 12/2010 | Platonov | B82Y 10/00 378/49 |
| 7,864,922 B2 | 1/2011 | Kawabe | |
| 7,889,838 B2 | 2/2011 | David et al. | |
| 7,899,154 B2 | 3/2011 | Chen et al. | |
| 7,920,676 B2 | 4/2011 | Yun et al. | |
| 7,924,973 B2 | 4/2011 | Kottler et al. | |
| 7,945,018 B2 | 5/2011 | Heismann | |
| 7,949,092 B2 | 5/2011 | Brons | |
| 7,949,095 B2 | 5/2011 | Ning | |
| 7,974,379 B1 | 7/2011 | Case et al. | |
| 7,983,381 B2 | 7/2011 | David et al. | |
| 8,005,185 B2 | 8/2011 | Popescu | |
| 8,009,796 B2 | 8/2011 | Popescu | |
| 8,009,797 B2 | 8/2011 | Ouchi | |
| 8,041,004 B2 | 10/2011 | David | |
| 8,058,621 B2 | 11/2011 | Kommareddy | |
| 8,068,579 B1 | 11/2011 | Yun et al. | |
| 8,073,099 B2 | 12/2011 | Niu et al. | |
| 8,139,711 B2 | 3/2012 | Takahashi | |
| 8,165,270 B2 | 4/2012 | David et al. | |
| 8,184,771 B2 | 5/2012 | Murakoshi | |
| 8,233,587 B2 | 7/2012 | Sato | |
| 8,243,879 B2 | 8/2012 | Itoh et al. | |
| 8,306,183 B2 | 11/2012 | Koehler | |
| 8,351,570 B2 | 1/2013 | Nakamura | |
| 8,353,628 B1 | 1/2013 | Yun et al. | |
| 8,374,309 B2 | 2/2013 | Donath | |
| 8,451,975 B2 | 5/2013 | Tada | |
| 8,513,603 B1 * | 8/2013 | Lederman | G01N 23/2252 250/310 |
| 8,559,594 B2 | 10/2013 | Ouchi | |
| 8,559,597 B2 | 10/2013 | Chen et al. | |
| 8,565,371 B2 | 10/2013 | Bredno | |
| 8,591,108 B2 | 11/2013 | Tada | |
| 8,602,648 B1 | 12/2013 | Jacobsen et al. | |
| 8,632,247 B2 | 1/2014 | Ishii | |
| 8,755,487 B2 | 6/2014 | Kaneko | |
| 8,767,915 B2 | 7/2014 | Stutman | |
| 8,767,916 B2 | 7/2014 | Hashimoto | |
| 8,781,069 B2 | 7/2014 | Murakoshi | |
| 8,824,629 B2 | 9/2014 | Ishii | |
| 8,855,265 B2 | 10/2014 | Engel | |
| 8,859,977 B2 | 10/2014 | Kondoh | |
| 8,908,824 B2 | 12/2014 | Kondoh | |
| 8,972,191 B2 | 3/2015 | Stampanoni et al. | |
| 8,989,474 B2 | 3/2015 | Kido et al. | |
| 9,001,967 B2 | 4/2015 | Baturin | |
| 9,016,943 B2 | 4/2015 | Jacobsen et al. | |
| 9,025,725 B2 | 5/2015 | Kiyohara et al. | |
| 9,031,201 B2 | 5/2015 | Sato | |
| 9,036,773 B2 | 5/2015 | David et al. | |
| 9,063,055 B2 | 6/2015 | Ouchi | |
| 9,086,536 B2 | 7/2015 | Pang et al. | |
| 9,129,715 B2 | 9/2015 | Adler et al. | |
| 9,222,899 B2 | 12/2015 | Yamaguchi | |
| 9,230,703 B2 | 1/2016 | Mohr et al. | |
| 9,234,856 B2 | 1/2016 | Mukaide | |
| 9,291,578 B2 | 3/2016 | Adler | |
| 9,329,141 B2 | 5/2016 | Stutman | |
| 9,357,975 B2 | 6/2016 | Baturin | |
| 9,390,881 B2 * | 7/2016 | Yun | H01J 35/08 |
| 9,439,613 B2 | 9/2016 | Stutman | |
| 9,448,190 B2 * | 9/2016 | Yun | H01J 35/14 |
| 9,449,781 B2 * | 9/2016 | Yun | H01J 35/12 |
| 9,453,803 B2 | 9/2016 | Radicke | |
| 9,480,447 B2 | 11/2016 | Mohr et al. | |
| 9,486,175 B2 | 11/2016 | Fredenberg et al. | |
| 9,494,534 B2 | 11/2016 | Baturin | |
| 9,532,760 B2 | 1/2017 | Anton et al. | |
| 9,551,677 B2 * | 1/2017 | Mazor | G01N 23/223 |

(56) References Cited

U.S. PATENT DOCUMENTS

| | | | |
|---|---|---|---|
| 9,557,280 B2 | 1/2017 | Pfeiffer et al. | |
| 9,570,265 B1 * | 2/2017 | Yun | H01J 35/147 |
| 9,588,066 B2 | 3/2017 | Pois et al. | |
| 9,594,036 B2 * | 3/2017 | Yun | H01J 35/153 |
| 9,632,040 B2 | 4/2017 | Stutman | |
| 9,700,267 B2 | 7/2017 | Baturin et al. | |
| 9,719,947 B2 * | 8/2017 | Yun | H01J 35/08 |
| 9,748,012 B2 | 8/2017 | Yokoyama | |
| 9,757,081 B2 | 9/2017 | Proksa | |
| 9,761,021 B2 | 9/2017 | Koehler | |
| 9,770,215 B2 | 9/2017 | Souohay et al. | |
| 9,778,213 B2 * | 10/2017 | Bakeman | G01N 23/223 |
| 9,823,203 B2 | 11/2017 | Yun et al. | |
| 9,826,949 B2 | 11/2017 | Ning | |
| 9,861,330 B2 | 1/2018 | Rossi | |
| 9,874,531 B2 | 1/2018 | Yun et al. | |
| 9,881,710 B2 | 1/2018 | Roessl | |
| 9,916,655 B2 | 3/2018 | Sampanoni | |
| 10,028,716 B2 | 7/2018 | Rossi | |
| 10,045,753 B2 | 8/2018 | Teshima | |
| 10,074,451 B2 | 9/2018 | Kottler et al. | |
| 10,076,297 B2 | 9/2018 | Bauer | |
| 10,085,701 B2 | 10/2018 | Hoshino | |
| 10,141,081 B2 | 11/2018 | Preusche | |
| 10,151,713 B2 | 12/2018 | Wu et al. | |
| 10,153,061 B2 | 12/2018 | Yokoyama | |
| 10,153,062 B2 | 12/2018 | Gall et al. | |
| 10,247,683 B2 * | 4/2019 | Yun | G01N 23/2055 |
| 10,267,752 B2 | 4/2019 | Zhang et al. | |
| 10,267,753 B2 | 4/2019 | Zhang et al. | |
| 10,295,485 B2 | 5/2019 | Yun et al. | |
| 10,295,486 B2 * | 5/2019 | Yun | G01N 23/20058 |
| 10,304,580 B2 | 5/2019 | Yun et al. | |
| 10,349,908 B2 * | 7/2019 | Yun | A61B 6/484 |
| 10,352,695 B2 | 7/2019 | Dziura et al. | |
| 10,352,880 B2 | 7/2019 | Yun et al. | |
| 10,401,309 B2 | 9/2019 | Yun et al. | |
| 10,416,099 B2 | 9/2019 | Yun et al. | |
| 10,466,185 B2 | 11/2019 | Yun et al. | |
| 10,473,598 B2 * | 11/2019 | Ogata | G01N 23/203 |
| 10,485,492 B2 | 11/2019 | Koehler et al. | |
| 10,514,345 B2 * | 12/2019 | Ogata | G01N 23/223 |
| 10,514,346 B2 * | 12/2019 | Sako | G01N 23/207 |
| 10,568,588 B2 | 2/2020 | Koehler et al. | |
| 10,578,566 B2 * | 3/2020 | Yun | G01N 23/2209 |
| 10,634,628 B2 * | 4/2020 | Kasper | H01L 21/68764 |
| 10,653,376 B2 | 5/2020 | Yun et al. | |
| 10,697,902 B2 | 6/2020 | Sharma et al. | |
| 10,782,252 B2 * | 9/2020 | Gateshki | G01N 23/20 |
| 10,794,845 B2 * | 10/2020 | Filsinger | G21K 1/02 |
| 10,895,541 B2 * | 1/2021 | Shchegrov | G01N 23/2076 |
| 10,976,270 B2 * | 4/2021 | Wormington | G01N 23/201 |
| 2003/0142781 A1 | 7/2003 | Kawahara | |
| 2003/0223536 A1 | 12/2003 | Yun et al. | |
| 2004/0047446 A1 | 3/2004 | Platonov | |
| 2005/0282300 A1 | 12/2005 | Yun et al. | |
| 2006/0062350 A1 | 3/2006 | Yokhin | |
| 2006/0182322 A1 | 8/2006 | Bernhardt et al. | |
| 2007/0108387 A1 | 5/2007 | Yun et al. | |
| 2007/0183563 A1 | 8/2007 | Baumann | |
| 2007/0183579 A1 | 8/2007 | Baumann et al. | |
| 2007/0189449 A1 | 8/2007 | Baumann | |
| 2007/0248215 A1 | 10/2007 | Ohshima et al. | |
| 2008/0084966 A1 | 4/2008 | Aoki et al. | |
| 2008/0159475 A1 | 7/2008 | Mazor et al. | |
| 2008/0170662 A1 | 7/2008 | Reinhold | |
| 2008/0181363 A1 | 7/2008 | Fenter et al. | |
| 2008/0273662 A1 | 11/2008 | Yun | |
| 2009/0052619 A1 | 2/2009 | Endoh | |
| 2009/0092227 A1 | 4/2009 | David | |
| 2009/0154640 A1 | 6/2009 | Baumann et al. | |
| 2009/0316857 A1 | 12/2009 | David et al. | |
| 2010/0061508 A1 | 3/2010 | Takahashi | |
| 2010/0091947 A1 | 4/2010 | Niu | |
| 2010/0246765 A1 | 9/2010 | Murakoshi | |
| 2010/0260315 A1 | 10/2010 | Sato et al. |
| 2010/0284513 A1 | 11/2010 | Kawabe |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0030126 A1 | 1/2015 | Radicke |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0323478 A1 | 11/2015 | Stutman |
| 2015/0357069 A1 | 12/2015 | Yun et al. |
| 2016/0066870 A1 | 3/2016 | Yun et al. |
| 2016/0178541 A1 | 6/2016 | Hwang et al. |
| 2016/0206259 A1 | 7/2016 | Auclair et al. |
| 2017/0047191 A1 | 2/2017 | Yun et al. |
| 2017/0162288 A1 | 6/2017 | Yun et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0261935 A1 | 8/2019 | Kitamura |
| 2019/0317027 A1 | 10/2019 | Tsuboi et al. |
| 2019/0331616 A1 | 10/2019 | Schaff et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |

(56) References Cited

U.S. PATENT DOCUMENTS

| | | |
|---|---|---|
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |

FOREIGN PATENT DOCUMENTS

| | | |
|---|---|---|
| CN | 102325498 B | 1/2012 |
| CN | 102551761 A | 7/2012 |
| EP | 0751533 | 1/1997 |
| EP | 1169713 | 1/2006 |
| JP | H06-188092 | 7/1994 |
| JP | H07-194592 | 8/1995 |
| JP | H08-128971 | 5/1996 |
| JP | H08-184572 | 7/1996 |
| JP | H11-304728 | 11/1999 |
| JP | H11-352079 | 12/1999 |
| JP | 2001-021507 | 1/2001 |
| JP | 2003-149392 | 5/2003 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2010-236986 | 10/2010 |
| JP | 2011-033537 | 2/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2015-529984 | 7/2013 |
| JP | 2013-181811 | 9/2013 |
| JP | 2015-047306 | 3/2015 |
| JP | 2015-072263 | 4/2015 |
| JP | 2015-077289 | 4/2015 |
| JP | 2017-040618 | 2/2017 |
| KR | 10-2012-0091591 A | 8/2012 |
| KR | 10-2014-0059688 | 5/2014 |
| WO | WO 2007/125833 | 11/2007 |
| WO | WO 2008/068044 | 6/2008 |
| WO | WO 2009/104560 | 8/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |

OTHER PUBLICATIONS

"High performance benchtop EDXRF spectrometer with Windows®® software," published by: Rigaku Corp., Tokyo, Japan; 2017.
Altapova et al., "Phase contrast laminography based on Talbot interferometry," Opt. Express, vol. 20, No. 6, (2012) pp. 6496-6508.
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bech, "X-ray imaging with a grating interferometer," University of Copenhagen PhD. Thesis, (May 1, 2009).
Bech, "In-vivo dark-field and phase-contrast x-ray imaging," Scientific Reports 3, (2013), Article No. 03209.
Birkholz, "Chapter 4: Grazing Incidence Configurations," Thin Film Analysis by X-ray Scattering (Wiley-VCH Verlag GmbH & Co. KGaA, Weinheim, Germany, 2006).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).
Coan et al., "In vivo x-ray phase contrast analyzer-based imaging for longitudinal osteoarthritis studies in guinea pigs," Phys. Med. Biol, vol. 55(24) (2010), pp. 7649-7662.
Cohen et al., "Tunable laboratory extended x-ray absorption fine structure system," Rev. Sci. Instr. vol. 51, No. 3, Mar. 1980, pp. 273-277.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Fernández-Ruiz, "TXRF Spectrometry as a Powerful Tool for the Study of Metallic Traces in Biological Systems," Development in Analytical Chemistry, vol. 1 (2014), pp. 1-14.
Ge et al., "Investigation of the partially coherent effects in a 2D Talbot interferometer," Anal. Bioanal. Chern, vol. 401, (2011), pp. 865-870.
Greatz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Günther et al., "Full-field structured-illumination super-resolution X-ray transmission microscopy," Nature Comm. 10:2494 (2019) and supplementary information.
Harasse et al., "X-ray Phase Laminography with Talbot Interferometer", in Developments in X-Ray Tomography VII, Proc. SPIE vol. 7804 (2010), 780411.
Harasse et al., "Iterative reconstruction in x-ray computed laminography from differential phase measurements", Opt. Express, vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Hashimoto et al., "Improved reconstruction method for phase stepping data with stepping errors and dose fluctuations," Optics Express, vol. 28, No. 11, pp. 16363-16384 (2020).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Int'l, https://doi.org/10.1016/j.quaint.2018.10.018 (2018).
Honma et al., Full-automatic XAFS Measurement System of the Engineering Science Research II beamline BL14B2 at Spring-8, 2011, AIP Conference Proceedings 1234, pp. 13-16.
Howard et al., "High-Definition X-ray Fluorescence Elemental Mapping of Paintings," Anal. Chem., 2012, vol. 84(7), pp. 3278-3286.

(56) References Cited

OTHER PUBLICATIONS

Ide-Ekiessabi et al., "The role of trace metallic elements in neurodegenerative disorders: quantitative analysis using XRF and XANES spectroscopy," Anal. Sci., vol. 21(7) (Jul. 2005), pp. 885-892.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al., "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Kalasová et al., "Characterization of a laboratory-based X-ray computed nanotomography system for propagation-based method of phase contrast imaging," IEEE Trans. On Instr. And Meas., DOI 10.1109/TIM.2019.2910338 (2019).
Keyrilainen et al., "Phase contrast X-ray imaging of breast," Acta Radiologica, vol. 51 (8), (2010), pp. 866-884.
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys, vol. 108(11), (2010), 114906.
Kulow et al., "On the Way to Full-Field X-ray Fluorescence Spectroscopy Imaging with Coded Apertures," J. Anal. At. Spectrom. Doi: 10.1039/C9JA00232D (2019).
Kuwabara et al., "Hard-X-ray Phase-Difference Microscopy with a Low-Brilliance Laboratory X-ray Source", Appl. Phys. Express vol. 4 (2011) 062502.
Li et al., "X-ray phase-contrast imaging using cascade Talbot-Lau interferometers," Proc. SPIE 10964 (2018), pp. 1096469-1-1096469-6.
Lohmann et al., "An interferometer based on the Talbot effect," Optics Communications vol. 2 (1971), pp. 413-415.
Lübcke et al., "Soft X-ray nanoscale imaging using a sub-pixel resolution charge coupled device (CCD) camera," Rev. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879 , (2019).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multilenses for large field of view pixel super-resolution scanning transmission hard X-ray microscopy," J. Synch. Rad., vol. 28 https://doi.org/10.1107/S1600577521001521 (2021).
Matsuyama et al., "Wavefront measurement for a hard-X-ray nanobeam using single-grating interferometry", Opt Express vol. 20 (2012), pp. 24977-24986.
Miao et al., "Motionless phase stepping in X-ray phase contrast imaging with a compact source," Proceedings of the National Academy of Sciences, vol. 110(48), (2013), pp. 19268-19272.
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. 1527-1530.
Momose et al.,"Demonstration of X-Ray Talbot Interferometry", Jpn. J. Appl. Phys. vol. 42 (2003), pp. L866-L868.
Momose et al.."Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. vol. 45 2006 pp. 5254-5262.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys, vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.

(56) References Cited

OTHER PUBLICATIONS

Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al.,"Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seifert et al., "Talbot-Lau x-ray phase-contrast setup for fast scanning of large samples," Sci. Rep. 9:4199, pp. 1-11 (2019).
Shimura et al., "Hard x-ray phase contrast imaging using a tabletop Talbot-Lau interferometer with multiline embedded x-ray targets", Opt. Lett. vol. 38(2) (2013), pp. 157-159.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Taphorn et al., "Grating-based spectral X-ray dark-field imaging for correlation with structural size measures," Sci. Reports, vol. 10, 13195 (2020).
Terzano et al., Recent advances in analysis of trace elements in environmental samples by X-ray based techniques (IUPAC Technical Report), Pure Appl. Chem. 2019.
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.

(56) References Cited

OTHER PUBLICATIONS

Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys, vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot—Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wilde et al., "Modeling of an X-ray grating-based imaging interferometer using ray tracing," Op. Express vol. 28, No. 17, p. 24657 (2020).
Withers et al., "X-ray computed tomography," Nature Reviews | Methods Primers, vol. 1, No. 18, pp. 1-21 (2021).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Yamada et al., "Compact full-field hard x-ray microscope based on advanced Kirkpatrick-Baez mirrors," Optica, vol. 7, No. 4 pp. 367-370 (2020).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yasihoro et. al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Distribution of unresolvable anisotropic microstructures revealed in visibility-contrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561,https://doi.org/10.1038/s41598-020-63155-9 (2020).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).

\* cited by examiner

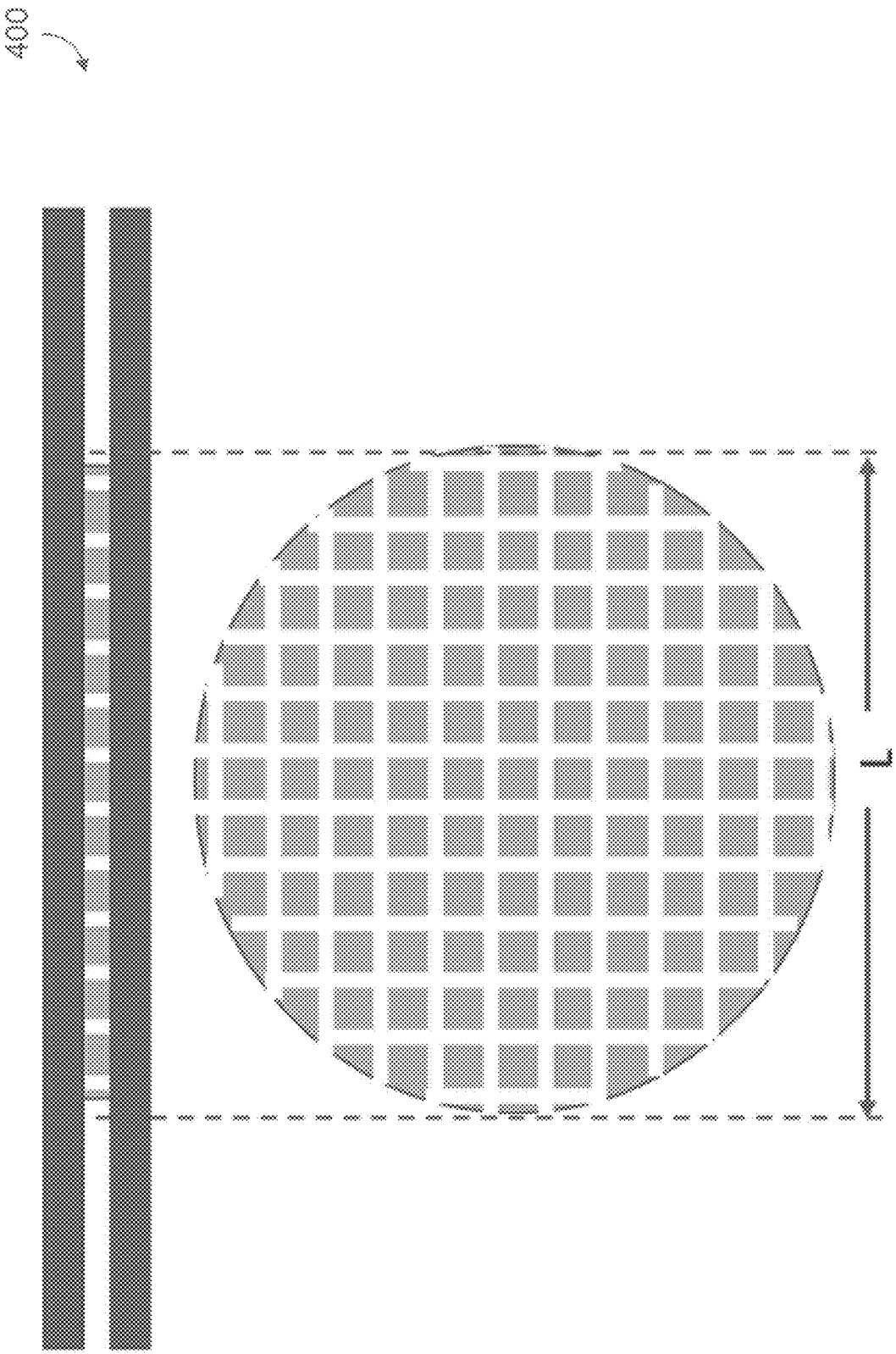

SYSTEM AND METHOD FOR COMPUTED LAMINOGRAPHY X-RAY FLUORESCENCE IMAGING

CLAIM OF PRIORITY

This application claims the benefit of priority to U.S. Provisional Appl. No. 62/895,342 filed on Sep. 3, 2019 and incorporated in its entirety by reference herein.

BACKGROUND

Field

The present application relates generally to systems and methods for x-ray fluorescence imaging.

Description of the Related Art

X-ray fluorescence (XRF) has been the most widely used chemistry (e.g., elemental composition) analysis technique for over 100 years. X-ray fluorescence imaging (XRFI) is a powerful technique for the quantitative mapping of elements at ultra-trace detection sensitivity that is increasingly applied to biological problems (see, e.g., R. McRae et al., "In situ imaging of metals in cells and tissues," Chem Rev. Vol. 109, pp. 4780-4827 (2009); C. J. Fahrni, "Biological applications of X-ray fluorescence microscopy: Exploring the subcellular topography and speciation of transition metals," Current Opinion in Chem. Biol. Vol. 11, No. 2, pp. 121-127 (2007); T. Paunesu et al., "X-ray fluorescence microprobe imaging in biology and medicine," J. Cell. Biochem. Vol. 99, pp. 1489-1502 (2006)). FIG. 1 schematically illustrates the physical principles of XRF in which incident x-rays of sufficient energy eject inner shell electrons from an atom (ionization), leaving an inner shell core-hole that is subsequently filled by an outer shell orbital electron having at a higher energy. The transition from a higher energy shell to a lower energy shell by the electron results in the emission of a "characteristic" x-ray fluorescence photon with energy equal to the difference of the shell level energies (binding energy). The binding energy is unique to each element, which enables multi-element analysis by measuring the x-ray energies emitted by a specimen.

In the past two decades, scanning x-ray fluorescence imaging with micron resolution (microXRFI) has advanced significantly due to new developments in synchrotron light sources, x-ray focusing optics, and detector technology. MicroXRFI can offer sensitivities that are below parts per million (sub-ppm), simultaneous analysis of multiple elements, straightforward quantification, high spatial resolution (e.g., microns to 30 nanometers), and experimental flexibility in accommodating various specimen sizes and shapes. MicroXRFI can also offer the capability to analyze specimens that are wet, cryo-preserved, and fixed and/or stained under a range of flexible operating conditions (e.g. ambient or cryogenic). Moreover, because it is non-destructive, microXRFI enables correlative or follow-on analysis by techniques such as infrared and Raman spectroscopy/microscopy, molecular mass spectroscopy such as MALDI, and secondary ion mass spectroscopy (SIMS). MicroXRFI can have much higher spatial resolution than does laser ablation with inductively coupled plasma mass spectroscopy (LA-ICP-MS), and orders of magnitude lower (better) detection sensitivity and lower radiation dose than do electron-based techniques.

The advantages of microXRFI have driven the development of specialized synchrotron beamlines and have motivated many synchrotron-based biomedical research studies. Results from such investigations have provided visualization of total (both free and bound) metal ions (with the latter invisible to most histological stains) at a spatial resolution of 5 microns or smaller. However, synchrotron-based imaging is constrained by accessibility and by the limited number of specimens that can be run. Access to such synchrotron beamlines is immensely competitive, as there are only a finite number of synchrotrons around the world with x-ray fluorescence beamlines due to the high costs (e.g., each synchrotron facility can cost upwards of $1B and each beamline can cost over $10M). Also, biological applications often compete for such access with other high-profile research disciplines, including defense, advanced materials, semiconductor, battery/energy, and oil and gas studies, resulting in the rejection of even some highly meritorious projects. Even if granted, beamtime is often limited to a week or a few days, which limits the number of specimens that can be analyzed within the available time and/or the time for changing the measurement protocol, such as improvements to specimen preparation or specimen selection. There are additional challenges as well, including logistics of traveling to the synchrotron and the associated cost.

SUMMARY

Certain implementations described herein provide a method for using x-ray fluorescence to analyze a specimen. The method comprises illuminating a specimen with an incident x-ray beam while the specimen has a first rotational orientation relative to the incident x-ray beam. The incident x-ray beam has a near-grazing incident angle relative to a surface of the specimen. The method further comprises collecting fluorescence x-rays generated by the specimen in response to the incident x-ray beam while the specimen has the first rotational orientation. The method further comprises rotating the specimen about a direction substantially perpendicular to the surface such that the specimen has a second rotational orientation relative to the incident x-ray beam. The second rotational orientation is different from the first rotational orientation by a rotation angle. The method further comprises illuminating the specimen with the incident x-ray beam while the specimen has the second rotational orientation. The method further comprises collecting fluorescence x-rays generated by the specimen in response to the incident x-ray beam while the specimen has the second rotational orientation.

Certain implementations described herein provide a system for x-ray fluorescence analysis of a specimen. The system comprises an x-ray source configured to generate x-rays and an x-ray optical subsystem configured to receive the x-rays from the x-ray source and to direct at least some of the received x-rays as an x-ray beam to illuminate a specimen. The x-ray beam has a near-grazing incident angle relative to a surface of the specimen. The system further comprises a specimen stage configured to support the specimen and to move the specimen in a plane parallel to the surface and to rotate the specimen around a direction perpendicular to the surface. The system further comprises at least one energy-discriminating detector configured to measure at least some fluorescence x-rays emitted from the surface in response to the incident x-ray beam.

BRIEF DESCRIPTION OF THE DRAWINGS

FIG. 7 schematically illustrates a side view and a top view of an example model specimen in accordance with certain implementations described herein.

DETAILED DESCRIPTION

Overview

Figure 1:
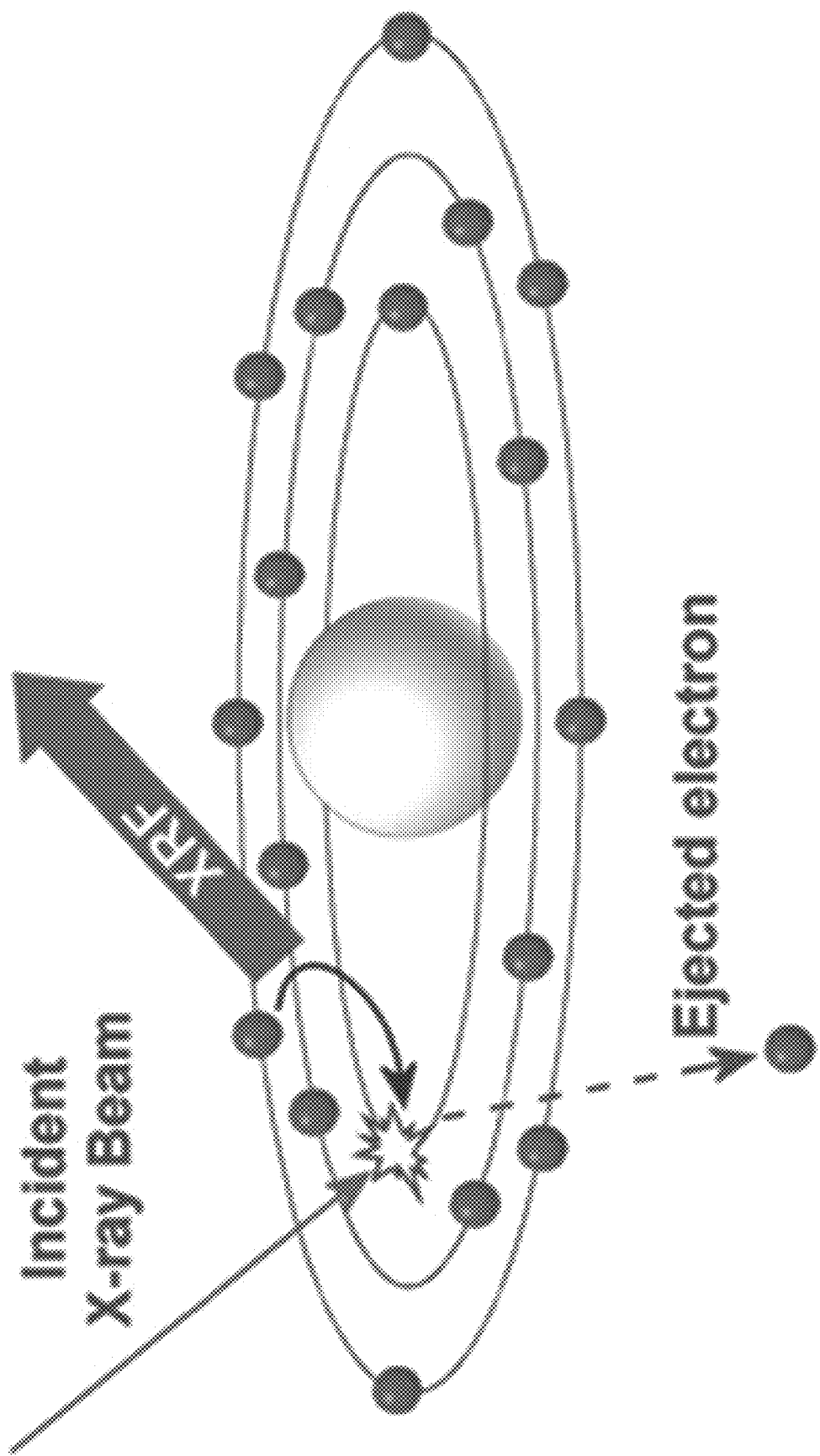
FIG. 1 schematically illustrates the physical principles of x-ray fluorescence (XRF).

Data acquisition by conventional XRFI systems and methods suffer from two major drawbacks. In a first such drawback, such conventional XRFI systems and methods are wasteful of the focused x-ray beam flux due to fluorescence x-rays generated deep below the sample surface being attenuated while propagating from the point of production to the surface. Such attenuation is especially problematic for low energy fluorescence x-rays, leading to low efficiencies in generating detectable fluorescence x-rays. For example, incident x-rays having energies sufficient for generating K-lines first-row transition metals have large penetration depths in biological specimens and, due to attenuation, only a small fraction of the generated fluorescence x-rays from low-Z elements inside a thick biological specimen propagate to the surface to be detected. Additionally, even if lateral resolution is maximized through the use of microfocus x-ray sources and x-ray optics with excellent focusing properties, depth resolution is still very coarse. In addition, characteristic fluorescent x-rays produced by distinct elements have different energies and therefore, for a thick specimen, elements that produce higher energy fluorescence x-rays can be overly represented in the detected spectra because such higher energy fluorescence x-rays have higher probabilities to escape the specimen surface even when generated deep within the specimen. As a result, quantitatively accurate understanding of a specimen using conventional XRFI systems and methods is difficult.

To compensate for the effects of such attenuation, thin specimen sections (e.g. tens of microns) have been used in conventional XRFI systems and methods. The use of these thin sections is also advantageous for correlative microscopy with other techniques such as optical microscopy for structural information. However, the absorption of x-rays in such thin sections is very low and most of the incident x-rays are therefore wasted. For example, for incident x-rays with energies around 8 keV (e.g., x-rays produced by a Cu x-ray target), which can be used to generate Fe K-shell characteristic fluorescence x-rays, only about 4% of the incident x-rays are absorbed by a 40-micron-thick hydrated brain section specimen in a conventional microXRFI configuration, while about 96% of the incident x-rays are transmitted through the specimen and are wasted. While such throughput losses may be acceptable with the high x-ray flux available at synchrotron light sources, such losses are problematic when using laboratory x-ray sources.

In a second drawback of conventional XRFI systems and methods, the collection solid angle of the fluorescence x-rays is restricted due to mechanical interference. Fluorescent x-rays are emitted isotropically by a specimen. To efficiently detect fluorescent x-rays, it is desirable to place the energy dispersive detector as close to the specimen as possible. However, in conventional XRFI systems and methods, the minimum distance of the detector to the specimen is severely constrained by the physical interference of the detector with the stage holding the specimen and the physical interference of the detector with the incident x-ray beam. For example, while the optimal placement of the detector would be close and parallel to the specimen surface to maximize the solid angle of collection, such placement of the detector would interfere with the line-of-sight of the incident x-ray beam to the specimen. Thus, in conventional XRFI systems and methods, the detector is far away from the specimen, resulting in a reduced detected intensity of the fluorescence x-rays.

Example Implementations

Certain implementations described herein provide a laboratory-based computed laminography X-ray fluorescence imaging (CL-XRFI) system and/or method for analyzing various types of specimens (e.g., semiconductor samples with thin films or dopants of interest; thin geological samples; biological specimens, such as thin sections of tissue). For just one example, certain implementations described herein are configured to accelerate the development and rational design of promising ferroptosis-inhibiting therapeutics for Alzheimer's Disease (AD) and other neurodegenerative diseases by providing attributes comparable to those of synchrotron-based microXRF (e.g., speed, quantitative properties, and sensitivity) with the accessibility of LA-ICP-MS. Other laboratory-based microXRFI systems experience a bottleneck in throughput at high sensitivities due to the low brilliance of the laboratory-based x-ray sources, low efficiencies of x-ray optics, and/or low XRF data collection methods. Certain implementations described herein advantageously provide over two orders of magnitude improvement in throughput (e.g., by a factor greater than or equal to 100) as compared to those of other laboratory-based microXRFI systems and synchrotron-like sensitivity (e.g., resolution better than or equal to 8 microns) with sub-ppm (relative) and sub-femtogram (absolute) detection sensitivities. In other examples, geological samples (e.g., rock sections) can be analyzed for information relevant to geology, oil and gas exploration, paleontology, and/or forensics; sections of plant-based samples (e.g., wood, paper, seeds, etc.) can be analyzed for information relevant to ecology, agriculture, forestry, and/or archeology; construction material samples (e.g., concrete, coatings, paints) can be analyzed for information relevant to corrosion, delamination, and/or failure analysis; other biological samples (e.g., sections of bone, teeth, other calcified tissue, cell cultures; other wet biological tissue) can be analyzed for information relevant to toxicology, biology, environmental studies in biology, medicine, food science, nutrition, pathology, etc.

Certain implementations described herein provide: (i) faster acquisition times (e.g., 8 minutes and 32 minutes acquisition times for 2D imaging of Fe and multiple other elements at 2-ppm detection sensitivity with 60-micron and 30-micron resolution, respectively) and/or (ii) non-destructive analysis with minimal sample preparation (e.g., enabling correlative analysis with other techniques, including thin sections prepared for optical microscopy to link quantitative metal distribution information with cellular structure information). Certain implementations can advantageously be utilized for AD research and drug development (e.g., imaging and quantification of Fe in preclinical AD models at various time points, enabling feedback on the efficacy of potential drugs).

Measurement Geometry

Certain implementations described herein provide an advantage over conventional XRF scanning systems and methods which use large incidence angles (e.g., normal incidence) by (i) efficiently using the incident x-ray beam for exciting XRF from the near-surface layer of the specimen and (ii) having the x-ray detector close to the specimen to provide a large solid angle of detection. Certain implementations described herein use laminography data collection and reconstruction methods to obtain spatial resolution comparable to the excitation x-ray beam size in a direction substantially parallel to the surface of an object being analyzed (e.g., specimen).

Figure 2:
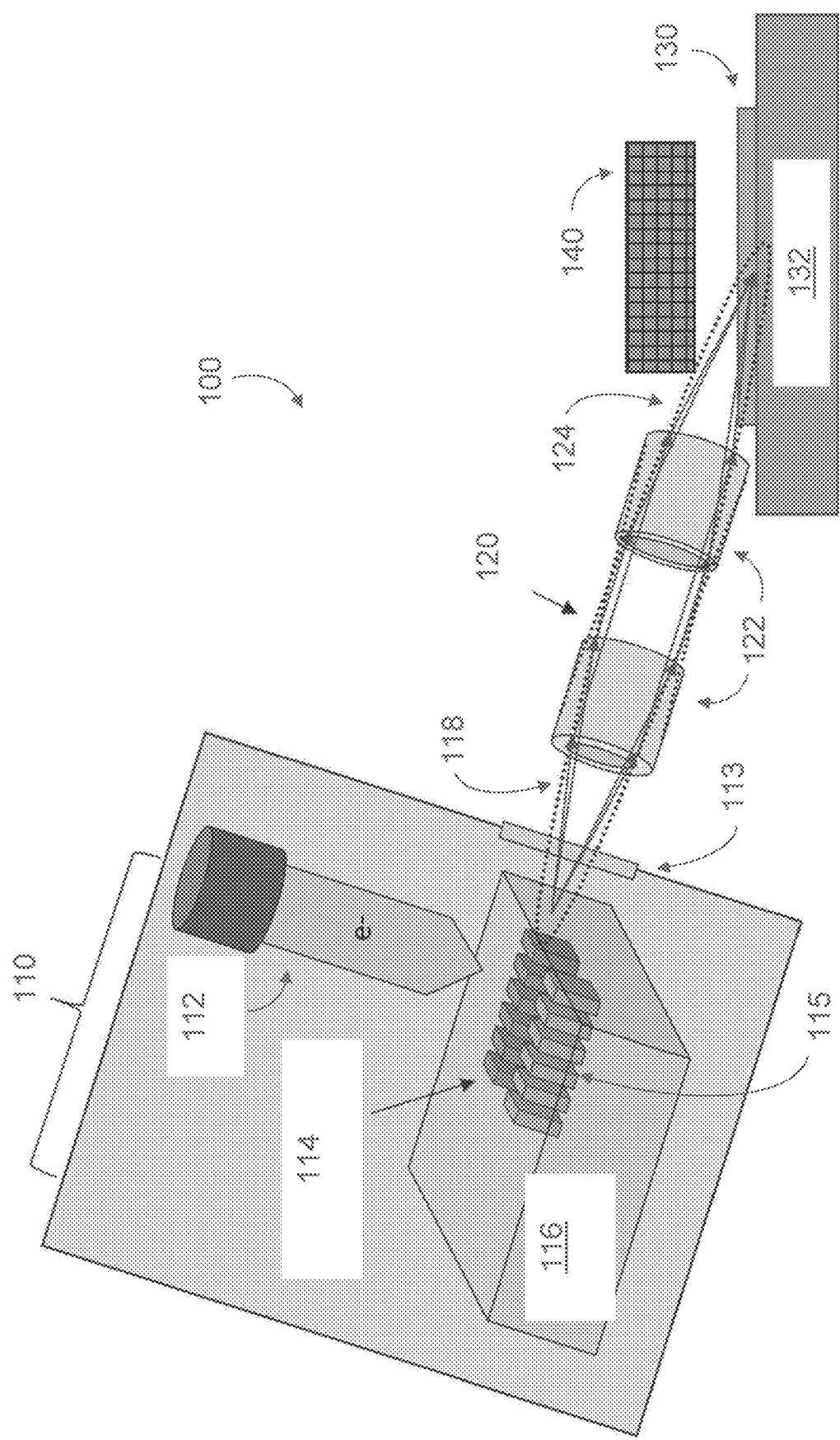
FIG. 2 schematically illustrates an example system in accordance with certain implementations described herein.

FIG. 2 schematically illustrates an example system 100 in accordance with certain implementations described herein. The example system 100 of FIG. 2 is a laboratory-based computed laminography XRFI (CL-XRFI) system that comprises a high efficiency x-ray source 110 comprising an electron source 112 and a microstructured anode target 114 on a thermally conductive substrate 116 and an x-ray optical subsystem 120 comprising a pair of twin paraboloidal x-ray optics 122 configured to receive x-rays 118 from the high efficiency x-ray source 110 and to focus at least some of the x-rays 118 into at least one focused x-ray beam 124 onto a specimen 130 (e.g., less than or equal to 800 microns thick) on a specimen stage 132 at a low incident angle geometry (e.g., grazing angle of 3 degrees), and at least one x-ray detector 140 configured to receive and detect at least some of the fluorescence x-rays emitted from the specimen 130 in response to the incident focused x-ray beam 124 from the x-ray optical subsystem 120. The specimen stage 132 is configured to move the specimen 130 being analyzed in the x-y plane (e.g., parallel to the specimen surface) and to rotate the specimen around the z-axis (e.g., perpendicular to the specimen surface and can be coincident with the spot on the specimen 130 illuminated by the incident focused x-ray beam 124) for laminography acquisition. Certain implementations described herein are configured to image trace elements (e.g., Fe) in specimens to concentrations less than or equal to 1 ppm with a spatial resolution less than or equal to 60 microns with a signal-to-noise ratio greater than or equal to 3, and total data collection times less than or equal to 40 minutes per specimen.

In certain implementations, the microstructured anode target 114 of the high efficiency x-ray source 110 comprises one or more metal-containing structures 115 (e.g., micron-sized metal structures) in thermal communication with the thermally conductive substrate 116 (e.g., diamond). For example, the high efficiency x-ray source 110 can comprise one or more metal-containing structures 115 having at least one material (e.g., Cu; SiC; MgCl; Al; Rh; Mo) on or embedded in a thermally conductive substrate 116 (e.g., diamond). For example, while FIG. 2 schematically illustrates a microstructured anode target 114 in which the one or more metal-containing structures 115 are embedded within a surface of the thermally conductive substrate 116, the microstructured anode target 114 of certain other implementations can comprise a thermally conductive substrate 116 having a plurality of thermally conductive struts (e.g., diamond) on the thermally conductive substrate 116 and having the at least one material affixed thereto (e.g., coated thereon). The at least one material of the one or more metal-containing structures 115 is configured to emit x-rays 118 with ultrahigh source brightness upon being bombarded by electrons from the electron source 112, the x-rays 118 emitted from the high efficiency x-ray source 110 through at least one window 113. For example, the one or more metal-containing structures 115 of the high efficiency x-ray source 110 can comprise a plurality of target materials configured to generate x-rays 118 in response to electron bombardment, the generated x-rays 118 of the target materials having corresponding spectral characteristics. The at least one material of the one or more metal-containing structures 115 is configured to emit x-rays 118 having energies higher than one or more characteristic x-ray fluorescence lines of the specimen 130 being analyzed. For example, the high efficiency x-ray source 110 can have a total power of 100 W with an effective x-ray source spot size of 30 microns by 30 microns (e.g., obtained with an electron beam footprint size of 300 microns by 30 microns on the one or more metal-containing structures 115 (e.g., micron-sized Cu structure) and an x-ray beam take-off angle relative to the thermally conductive substrate 116 (e.g., comprising diamond) of 10 degrees.

The x-ray source 110 of certain implementations provides various advantages, including but are not limited to: (i) incorporating the thermal properties of a diamond substrate 116 to increase an average thermal conductivity of the anode target 114, (ii) utilizing the dependence of the electron energy deposition rate from the electron source 112 on the mass density of the structures 115 to create a favorable energy deposition profile, (iii) creating large thermal gradients between the metal structures 115 and the surrounding diamond substrate 116 to produce enhanced thermal dissipation, and (iv) highly efficient accumulation of x-rays 118 along an x-ray beam axis aligned with the structures 115. The resulting brightness of certain implementations is substantially higher than that of conventional microfocus x-ray sources. Furthermore, the material of the structures 115 of the anode target 114 can be selected to provide a predetermined (e.g., optimized) fluorescence cross section for the element or elements to be analyzed. For example, Cu can be used in the structures 115 to provide intense Kα-line x-rays at 8.05 keV that are optimal for exciting Fe fluorescence. Such incident x-rays can enable count rates that are about 100× higher than those of other systems, and can enable semiconductor sub-atomic layer thickness measurements with 10-micron focus. Examples of x-ray sources 110 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

In certain implementations, the x-ray optical subsystem 120 is configured to focus at least some of the x-rays 118 from the x-ray source 110 into a focused x-ray beam 124 and to direct the focused x-ray beam 124 to irradiate the specimen 130 at a low x-ray beam incidence angle. The x-ray optical subsystem 120 can have a large working distance (e.g., a distance between the optic exit point and the specimen 130 greater than or equal to 15 millimeters, greater than or equal to 30 millimeters, greater than or equal to 40 millimeters) and a small point spread function (PSF) (e.g., less than or equal to 20 microns), resulting in a narrow, pencil-like x-ray beam.

Conventional laboratory-based x-ray microbeam systems rely on polycapillary optics (e.g., tapered bundle of hollow glass capillaries) which have short working distances for the small focus that are not suitable for use in certain implementations described herein (e.g., due to the constrained geometry to be used). In addition, the "focus" of such polycapillary optics is not a true focal spot but instead is a point in space in which the exiting beam has a minimal diameter (e.g., the size being approximately equal to $2*\theta c*L$, where $\theta c$ is the critical angle and L is the working distance or the distance between the exit of the polycapillary and the "focus"). For example, for 8 keV x-rays, a polycapillary optic having a 30-micron focus has a working distance of only about 3 millimeters.

In certain implementations, the x-ray optical subsystem 120 comprises at least one x-ray reflecting optic having a quadric inner surface profile. For example, as schematically illustrated by FIG. 2, the x-ray optical subsystem 120 comprises a pair of twin paraboloidal x-ray optics 122. In certain implementations, the pair of twin paraboloidal x-ray optics 122 comprises a first paraboloidal mirror 122 positioned and aligned to collect and collimate at least some of the x-rays 118 from the x-ray source 110 and a second paraboloidal mirror 122 configured to focus at least some of the collimated x-rays from the first paraboloidal mirror 122 into the focused x-ray beam 124 and to direct the focused x-ray beam 124 to illuminate the specimen 130. In certain implementations, each of the two paraboloidal mirrors 122 is axially symmetric, while in certain other implementations, at least one of the two paraboloidal mirrors 122 is not axially symmetric.

The two paraboloidal mirrors 122 of certain implementations are true imaging optics and the focal spot of the focused x-ray beam 124 is independent of x-ray energy (e.g., the two reflections from the two paraboloidal mirrors 122 compensate for each other). The working distances for small spot sizes from the two paraboloidal x-ray mirrors 122 of certain implementations are very large (e.g., greater than or equal to 15 millimeters; greater than or equal to 30 millimeters; greater than or equal to 40 millimeters) and can provide pencil-like x-ray beams that can be employed for low incidence angle x-ray imaging. In certain implementations, the paraboloidal mirrors 122 have slope errors of less than 5 microradians and surface roughness on the order of Angstroms. In certain implementations, the x-ray optical subsystem has a resolution limit in which the focal spot at (e.g., incident upon) the specimen 130 (e.g., the focal spot in or on the specimen 130) is substantially elliptically-shaped with its longer dimension less than or equal to 50 microns in at least one direction substantially parallel to the specimen surface (e.g., in a range of 10 microns to 30 microns; in a range of 5 microns to 10 microns; in a range less than 5 microns; in a range less than 1 micron). For example, the x-ray optical subsystem of certain implementations can generate a FWHM spot size that is less than or equal to 600 nanometers, which can resolve 400 nanometer lines and spaces using resolution target standards.

In certain implementations, the first paraboloidal mirror 122 comprises at least one first substrate and at least one first layer (e.g., a depth-graded multilayer coating; high Z material coating) on the at least one first substrate and the first paraboloidal mirror 122 is configured to efficiently collect and collimate at least some of the x-rays 118 emitted from the x-ray source 110, the collected and collimated x-rays having specific x-ray energies reflected by the at least one first layer. The second paraboloidal mirror 122 also comprises at least one second substrate and at least one second layer (e.g., a depth-graded multilayer coating; high Z material coating) on the at least one second substrate and the second paraboloidal mirror 122 is configured to efficiently collect and focus at least some of the x-rays reflected from the first paraboloidal mirror 122, the collected and focused x-rays having specific x-ray energies reflected by the at least one second layer. In certain implementations, the at least one first substrate and the at least one second substrate are portions of a unitary or monolithic substrate (e.g., a cylindrical glass capillary tube), while in certain other implementations, the at least one first substrate and the at least one second substrate are separate from one another.

For example, the two paraboloidal mirrors 122 can have a total length in a range of 20 millimeters to 500 millimeters (e.g., 120 millimeters) and each mirror 122 can have a 30-nanometer thick platinum coating, the first paraboloidal mirror 122 can have a collection cone angle of 28 milliradians, the working distance of the x-ray optical subsystem 120 can be sufficiently long (e.g., 40 millimeters) to enable low-incidence angle geometry, and the x-ray optical subsystem 120 can have a point spread function (PSF) that is less than or equal to 5 microns (e.g., to enable focusing down to x-ray spot sizes in a range of 20 microns to 60 microns at the specimen 130, depending on the apparent spot size from the x-ray source 110). For example, a focused spot size of 60 microns can be used for more coarse resolution imaging of a whole rat brain specimen 130 with a linear dimension of 1.5 centimeters and a focused spot size of 20 microns can be used for finer resolution imaging of selected areas of the specimen 130. Example paraboloidal mirrors 122 compatible with certain implementations described herein are disclosed by U.S. Pat. Appl. Publ. Nos. 2019/0369272 and 2020/0072770, each of which is incorporated in its entirety by reference herein.

Although not shown in FIG. 2, the x-ray optical subsystem 120 of certain implementations comprises a beam stop positioned on a longitudinal axis of one or both of the two paraboloidal mirrors 122 (e.g., at or near an upstream end of one of the mirrors 122; at or near a downstream end of one of the mirrors 122; upstream from one or both of the mirrors 122; downstream from one or both of the mirrors 122). The beam stop can be configured to prevent x-rays that are not reflected by the x-ray optical system 120 from impinging the specimen 130. Example beam stops compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

In certain implementations, the specimen stage 132 is configured to hold the specimen 130 such that the specimen 130 is positioned to receive at least a portion of the focused x-ray beam 124 and the at least one x-ray detector 140 is configured to receive fluorescence x-rays from the specimen 130 (e.g., positioned downstream from the x-ray optical subsystem 120 and upstream from the at least one x-ray detector 140). In certain implementations, the specimen stage 132 is configured to move the specimen 130 being analyzed in the x-y plane (e.g., parallel to the specimen surface) and to rotate the specimen 130 about the z-axis (e.g., perpendicular to the specimen surface and can be coincident with the spot on the specimen 130 illuminated by the incident x-ray beam 124) as described more fully herein. For example, the specimen stage 132 can comprise an x-y translation motorized sub-stage with a travel range of 100 millimeters or more in each of two orthogonal directions and a rotational motorized sub-stage (e.g., on top of the x-y translation motorized sub-stage) with a rotation range of at least 90 degrees, at least 180 degrees, or 360 degrees or more. In certain implementations, the specimen stage 132 can comprise a goniometer system (e.g., theta-2-theta stage) configured to vary the angle at which the specimen 130 is impinged by the incident x-ray beam 124 (e.g., the incident angle). For example, the goniometer system can be configured to vary the angle in a range from normal incidence (e.g., 90 degrees) to near-grazing incidence and can be configured to move both the x-ray source 110 and the at least one detector 140 relative to the specimen 130 at varying angles of incidence). Examples of a stage 132 compatible with certain implementations described herein are disclosed (in conjunction with other systems different from those described herein) in U.S. Pat. Nos. 9,719,947; 9,874,531; 10,349,908; 10,352,880, each of which is incorporated in its entirety by reference herein.

In certain implementations, the at least one x-ray detector 140 is configured to detect and measure at least a portion of the x-ray fluorescence emitted from the specimen 130. For example, the at least one x-ray detector 140 can comprise an energy dispersive detector configured to detect the fluorescence x-rays emitted from the specimen 130 and to discriminate x-rays having different energies (e.g., to generate images indicative of the elemental distribution of the specimen 130). For example, the at least one x-ray detector 140 can comprise one or more of: a silicon drift detector (SDD) (e.g., having an active area of 50 mm$^2$), x-ray wavelength dispersive spectrometers, photon counting detectors, pin diode detectors. Examples of x-ray detectors 140 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

Figures 3A, 3B:
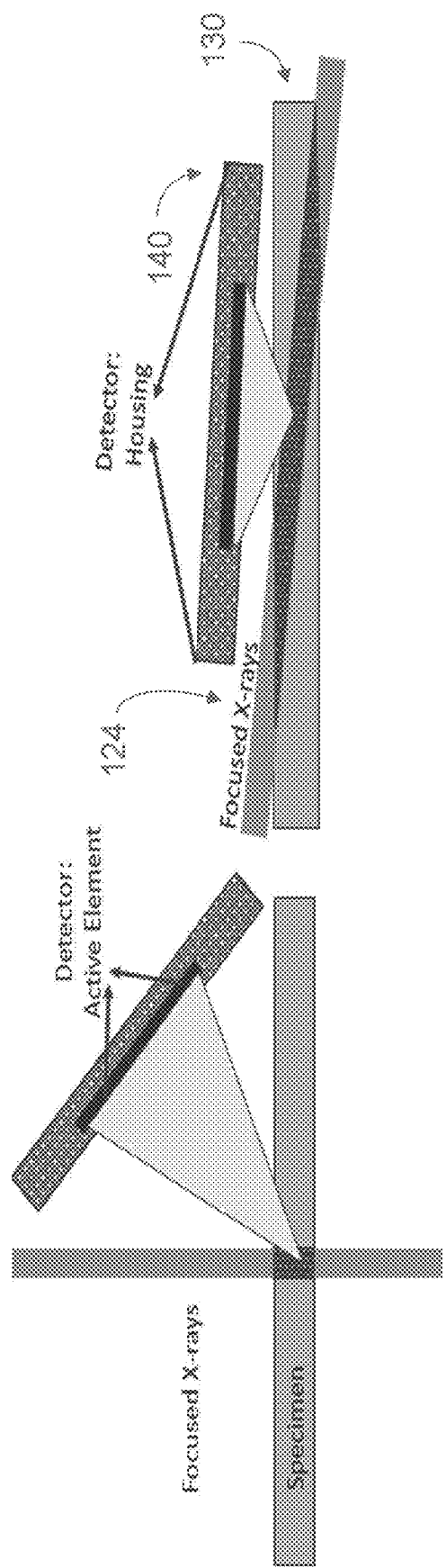
FIG. 3A schematically illustrates an example configuration of a conventional synchrotron and laboratory microXRFI system for specimens.
FIG. 3B schematically illustrates an example configuration of the system, with the same specimen as in FIG. 3A, in accordance with certain implementations described herein

FIG. 3A schematically illustrates an example configuration of a conventional synchrotron and laboratory microXRFI system for biological specimens (e.g., thin section of brain specimen). Such conventional systems typically have an incident focused x-ray beam impinging the sample at large incidence angles (e.g., incidence angle θ in a range of 45 to 90 degrees with respect to the sample or specimen surface). For example, as shown in FIG. 3A, the incident focused x-ray beam is incident substantially perpendicularly to the sample surface. Such large incident x-ray beam angles are intended to have the size of the focal spot of the x-ray beam on the specimen surface to be close or equal to the cross-section of the x-ray beam. For an incident angle θ equal to 90 degrees in the scattering plane defined by the incident beam and the specimen surface normal (as shown in FIG. 3A), the focal spot size equals the cross-section of the focused x-ray beam, and for an incident angle in a range of 45 degrees to 90 degrees, the focal spot size is close to the x-ray beam cross-section. Conventional systems do not utilize small incident angles because such incident angles would "stretch" the focal spot size on the sample surface (e.g., by a factor of $1/\sin \theta$), thereby reducing the spatial resolution of the system.

Due to the low atomic number (low Z) matrix of biological specimens, x-rays have large penetration depths in such biological specimens. This large penetration depth can adversely impact the spatial resolution of the system, because even when lateral resolution is maximized through use of microfocus x-ray sources and x-ray optics with excellent focusing properties, depth resolution is still very coarse. In addition, characteristic fluorescence x-rays produced by distinct atomic elements have different energies and therefore, for a thick specimen, the atomic elements that produce higher energy fluorescence x-rays are overly represented because their x-rays have sufficient energy to escape the specimen even when the fluorescence x-rays are produced deep within the specimen. As a result, quantitatively accurate understanding of a specimen can be difficult.

As described herein, thin (e.g., tens of microns) specimen sections can be used to compensate for the large penetration depth. For example, in the conventional system of FIG. 3A, a thin (e.g., thickness of 50 microns) specimen can be irradiated by the incident focused x-ray beam. However, due to the low absorption of the incident x-rays by such thin sections, a large fraction of the incident focused x-ray beam flux is transmitted through the specimen and does not contribute to the measurements, leading to a low efficiency in generating the fluorescence x-rays.

FIG. 3B schematically illustrates an example configuration of the system 100, with the same biological specimen 130 (e.g., thin section of brain specimen) as in FIG. 3A, in accordance with certain implementations described herein. The incident focused x-ray beam 124 impinges the specimen (e.g., sample being analyzed) 130 at a near-grazing incident angle relative to the specimen surface. For example, the near-grazing incident angle can be a small incidence angles θ with respect to the specimen surface (e.g., in a range of 1 degree to 15 degrees; in a range of 2 degrees to 4 degrees; in a range of 4 degrees to 7 degrees; in a range of 7 degrees to 14 degrees; in a range less than 5 degrees). In certain such implementations, the near-grazing incident angle is above a critical angle of the specimen 130 (e.g., in a range of incident angles at which the incident x-ray beam 124 is totally externally reflected from the specimen surface). In contrast to configurations which use large incident x-ray beam angles (e.g., in FIG. 3A), the size of the focal spot of the x-ray beam 124 on the specimen surface is significantly larger than the cross-section of the x-ray beam 124 in a plane substantially perpendicular to the propagation direction of the x-ray beam 124 (e.g., by a factor of $1/\sin \theta$). However, due to the longer path lengths of the x-ray beam 124 through the specimen 130 (e.g., about 20× for an incident angle of 3 degrees as compared to an incident angle of 90 degrees), a larger fraction of the incident x-rays of the x-ray beam 124 are absorbed by the specimen 130 and can therefore contribute to the generation of fluorescence x-rays within the specimen 130. Thus, certain implementations described herein advantageously provide more efficient use of the incident focused x-rays 124 using near grazing incidence angles due to the significantly longer path lengths of the focused x-ray beam 124.

The example system 100 schematically illustrated by FIGS. 2 and 3B provide another advantage over the conventional system schematically illustrated by FIG. 3A. As described herein, fluorescence x-rays are emitted isotropically by a specimen, and constraints due to mechanical interference in conventional XRFI systems and methods restrict minimum distance of the detector to the specimen (see, e.g., the conventional system of FIG. 3A) and the solid collection angle for the fluorescence x-rays emitted from the specimen.

In contrast to such conventional XRFI systems and methods, certain implementations described herein advantageously provide, as shown in FIG. 3B, significantly larger collection solid angles while having the active element of the detector 140 closer (e.g., by about 3×) and substantially parallel to the surface of the specimen 130. In the configuration schematically illustrated by FIG. 3B, the incident x-ray beam 124 impinges a first surface of the specimen 130 and an active element (e.g., silicon drift detector) of the at least one x-ray detector 140 is positioned substantially parallel to the specimen 130 to receive x-ray fluorescence emitted from the first surface (e.g., received by the at least one x-ray detector 60 from the same irradiated portion of the first surface and/or from a different portion of the first surface) in a large (e.g., maximum) solid angle (e.g., in a range greater than 0.5 steradian; in a range of 0.5 steradian to 2 steradians). As a result, the detected XRF signals resulting from such smaller distances between the detector 140 and the specimen 130 are higher than in conventional systems, due to the relaxation of the physical interference problem.

In certain implementations, the system 100 advantageously utilizes the focused x-ray beam 124 (e.g., pencil-beam) that is incident to the specimen 130 at a near grazing incidence angle (e.g., 3 degrees) to provide (i) efficient absorption of the focused x-ray beam 124 by the specimen 130 for efficiently generating the x-ray fluorescence signal (e.g., indicative of Fe within the specimen 130) and/or (ii) increased (e.g., maximized) solid angle of detection of the x-ray fluorescence by placing the detector 140 close to the specimen surface due to the reduced physical interference as compared to conventional systems.

In certain implementations, the near grazing incidence angle geometry advantageously provides efficient use of the incident x-rays. In certain implementations described herein, the x-ray beam path length inside a thin specimen section for smaller incidence angles (e.g., θ=3 degrees or near grazing incidence) can be 20× longer than for larger incidence angles (e.g., θ=90 degrees or normal incidence). For example, for a brain specimen with a thickness of 40 microns, the x-ray beam path length inside the specimen with θ=3 degrees is equal to 800 microns. For 8 keV incident x-ray beam 124, the x-ray linear attenuation length in hydrated brain tissue is about 1200 microns. Thus, the resulting generation of Fe fluorescence x-rays in the thin brain sections using the incidence angle of 3 degrees is up to 20× larger than for an incidence angle of 90 degrees, and is up to 14× larger than for an incidence angle of 45 degrees.

In certain implementations, the near grazing incidence angle geometry advantageously provides significant improvements in throughput due to the increased solid angle of detection for the detector (e.g., silicon drift detector or SDD) configured to detect the fluorescence x-rays. For example, by moving the detector from the conventional configuration (see, FIG. 3A) to a position directly above the specimen 130 (see, e.g., FIG. 3B), the minimum distance between the center detection element (e.g., pixel) of the detector 140 and the focused x-ray beam 124 at the specimen 130 can be reduced by a factor of three, resulting in an increase in fluorescence collection of about a factor of 9 (since the solid angle scales as the inverse square of the distance).

In certain implementations, the combination of the increased beam path length of the incident x-rays within the specimen 130 and the increased solid angle of detection for the detector 140 results in an increase of about 180× in the throughput. In addition, the near grazing incidence angle geometry can advantageously provide more accurate trace element quantification (e.g., Fe) because the attenuation of the fluorescence x-rays in the thin specimen is negligible. In certain implementations, a scan that would be estimated to take about 24 hours using a conventional system (e.g., based on fluorescence counts) can advantageously be reduced to 8 minutes using certain implementations described herein. In certain implementations, the quantification of low Z elements, such as biologically important elements phosphorous and sulfur, can be better quantified, either separately or together with iron, due to the short pathlength and low absorption of the fluorescence x-rays. This improved quantification applies to not only thin specimen sections, but also thick block specimens.

Data Acquisition

In certain implementations, the detector system 140 of the example system 100 is configured to use a data acquisition and image reconstruction method in conjunction with the geometrical configuration described herein (e.g., as shown in FIGS. 2 and 3B). This method is utilized for x-ray fluorescence and is analogous to computed laminography (CL) which is used in 3D x-ray absorption imaging of flat specimens and is a modified approach to computed tomography (CT), which is typically more optimal for cylindrical specimens (e.g., rock cores, human bodies, etc.). As described more fully herein, the near grazing incident angle geometry (see, FIGS. 2 and 3B) can be combined with the data acquisition and image reconstruction method to provide high, microns-scale 3D resolution for thin specimen sections.

In certain implementations, the method comprises scanning (e.g., raster scanning) the specimen relative to the incident x-ray beam at multiple rotations and detecting the fluorescence x-rays, and further comprises analyzing (e.g., reconstructing) the resulting data corresponding to the detected fluorescence x-rays. In certain implementations, the method advantageously provides high spatial resolution in the scattering plane that would otherwise be reduced due to the elongation of the incident x-ray beam at the near grazing incidence angle, thereby decoupling the constraint of near grazing incidence angle on resolution.

Figure 4A:
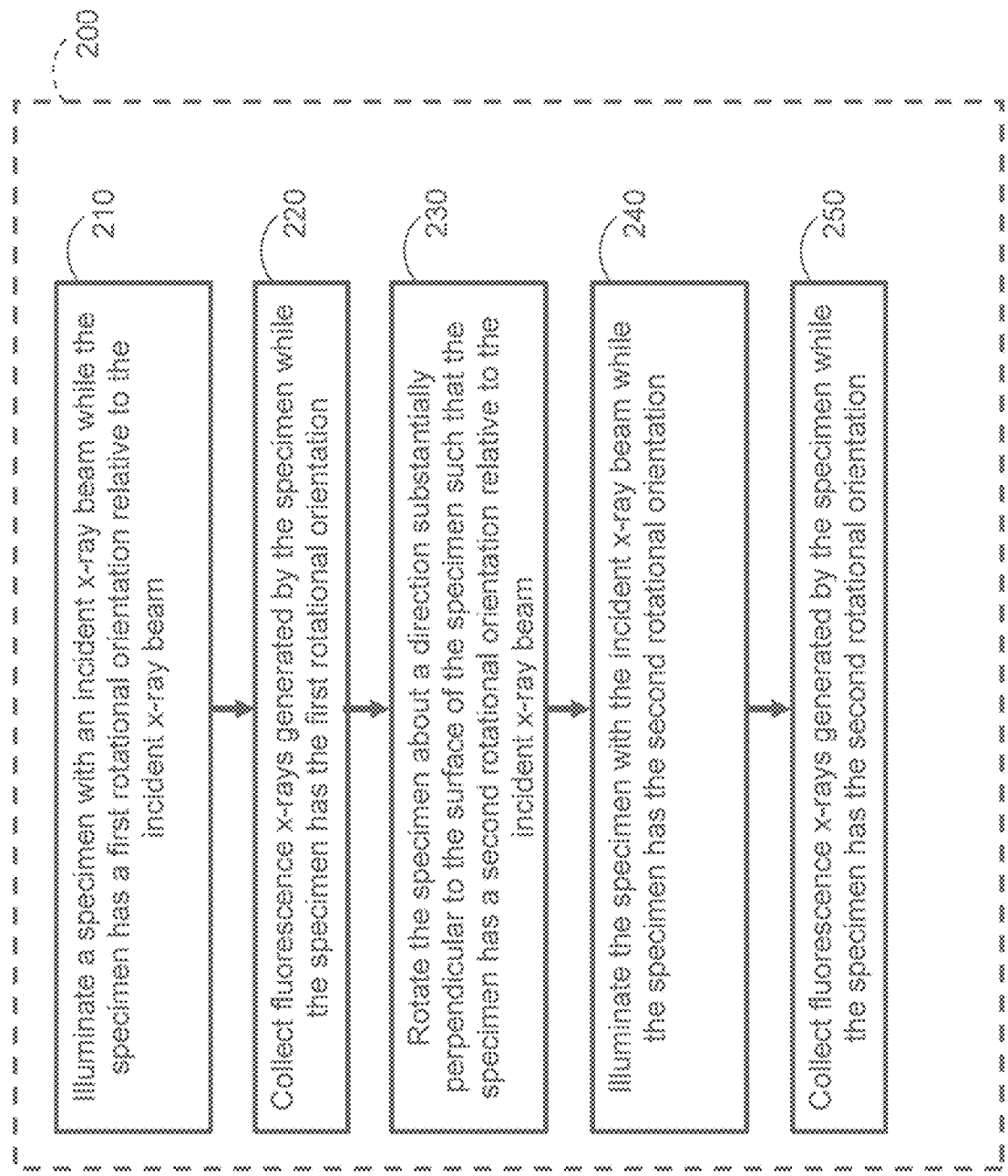
FIGS. 4A and 4B are two flow diagrams of example methods for data collection in accordance with certain implementations described herein.
Figure 4B:
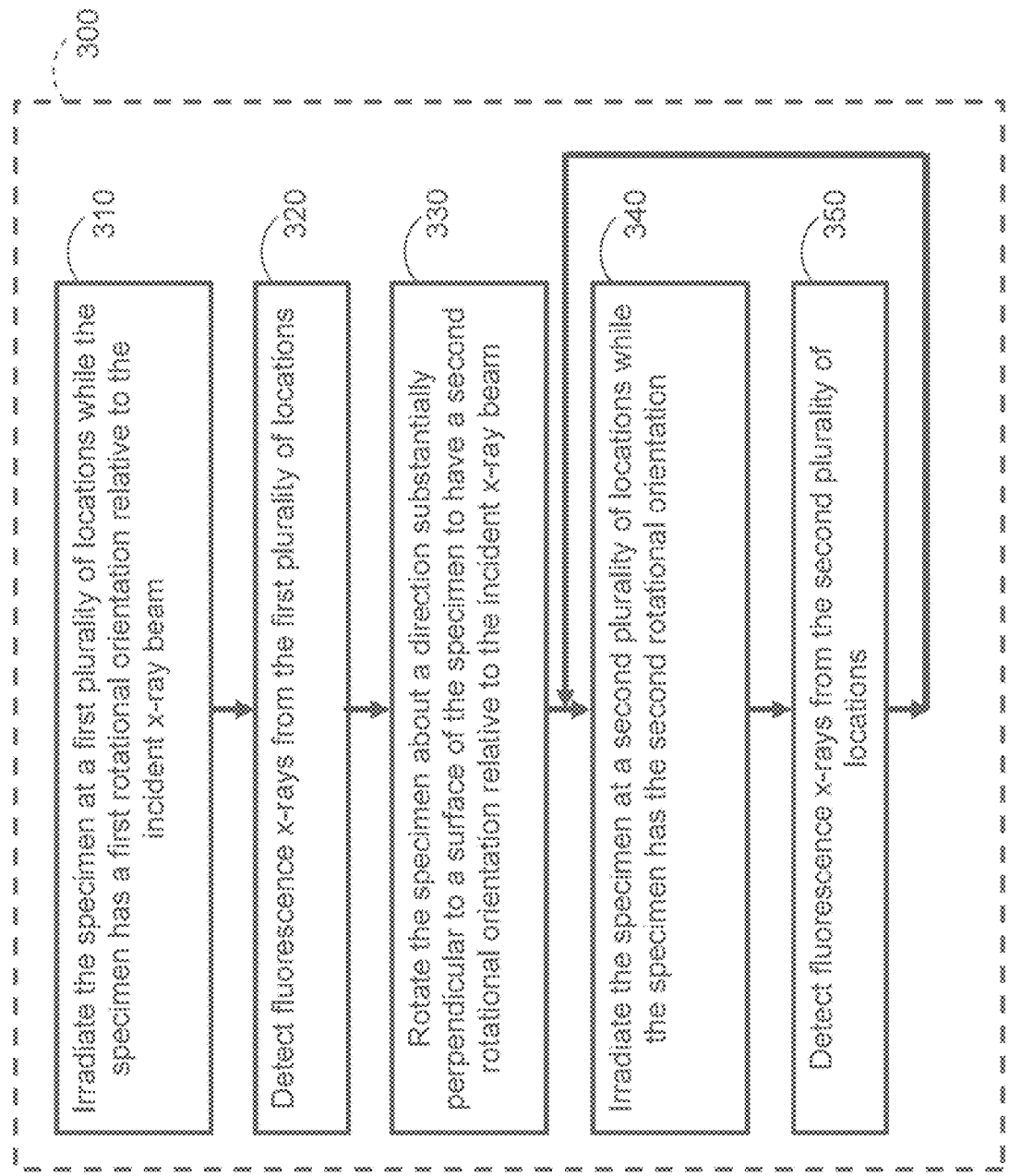
Figure 4C:
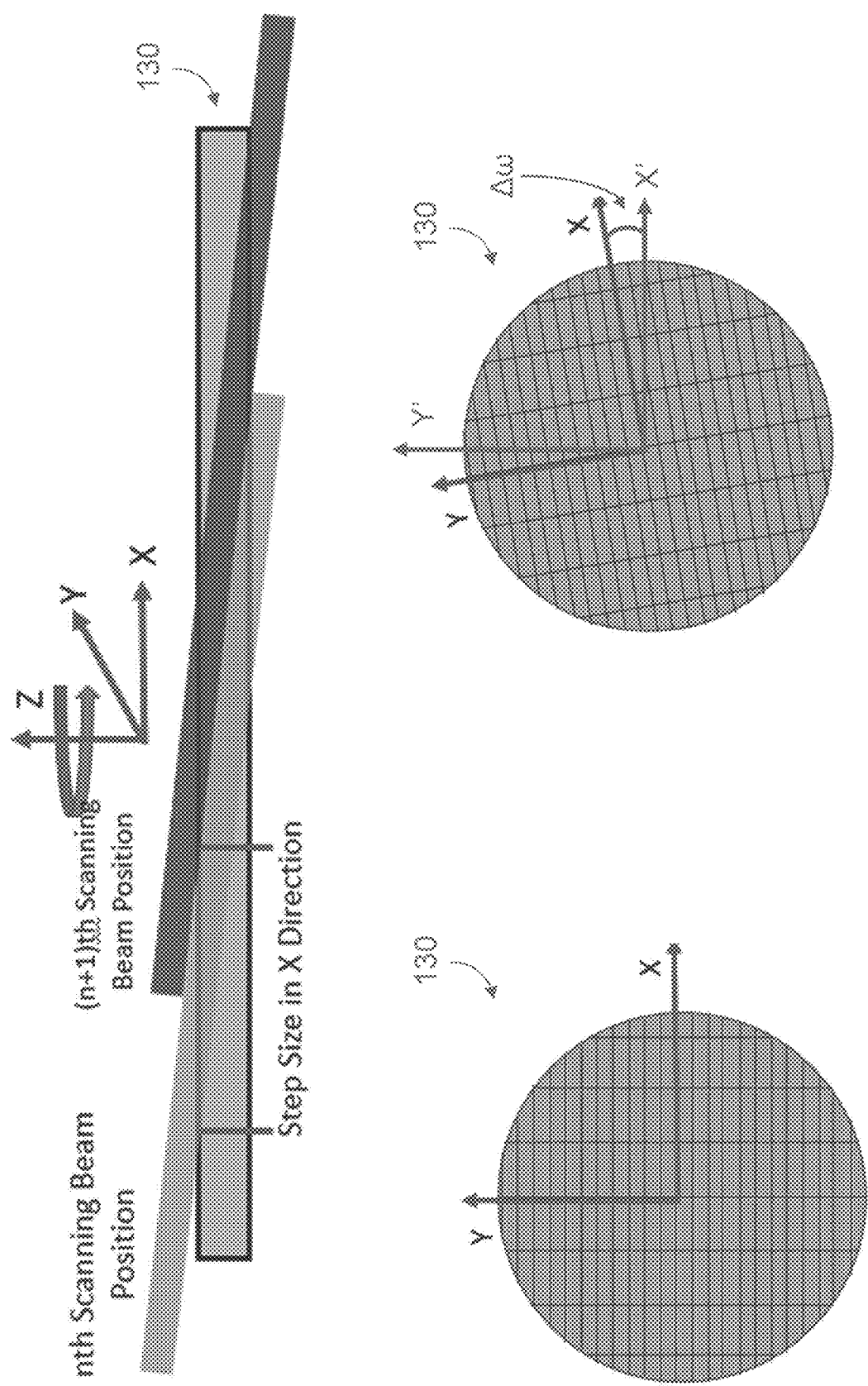
FIG. 4C schematically illustrates aspects of the example methods of FIG. 4B utilizing a data collection scheme with two-dimensional raster scanning in accordance with certain implementations described herein.

FIGS. 4A and 4B are two flow diagrams of two example methods 200, 300 for using x-ray fluorescence to analyze a specimen in accordance with certain implementations described herein The method 300 of FIG. 4B can be considered to be a particular example of the method 200 of FIG. 4A. FIG. 4C schematically illustrates aspects of the example methods 200, 300 utilizing a data collection scheme with 2D raster scanning in accordance with certain implementations described herein. The detector 140 is not shown in FIG. 4C for clarity. The example method 200 can be used to collect a complete dataset using a CL-XRFI system in accordance with certain implementations described herein.

As shown in FIG. 4A, in an operational block 210, the method 200 comprises illuminating a specimen 130 with an incident x-ray beam 124 while the specimen 130 has a first rotational orientation relative to the incident x-ray beam 124. The incident x-ray beam 124 has a near-grazing incident angle relative to a surface of the specimen 130. IN an operational block 220, the method 200 further comprises collecting fluorescence x-rays generated by the specimen 130 in response to the incident x-ray beam 124 while the specimen 130 has the first rotational orientation. In an operational block 230, the method 200 further comprises rotating the specimen 130 about a direction substantially perpendicular to the surface such that the specimen 130 has a second rotational orientation relative to the incident x-ray beam 124. The second rotational orientation is different from the first rotational orientation by a rotation angle. In an operational block 240, the method 200 further comprises illuminating the specimen 130 with the incident x-ray beam 124 while the specimen 130 has the second rotational orientation. In an operational block 250, the method 200 further comprises collecting fluorescence x-rays generated by the specimen 130 in response to the incident x-ray beam 124 while the specimen 130 has the second rotational orientation.

In certain implementations, the method 200 further comprises rotating the specimen 130 about the direction substantially perpendicular to the surface such that the specimen 130 has a plurality of sequential rotational orientations relative to the incident x-ray beam 124, the sequential rotational orientations different from one another by the rotation angle, and while the specimen 130 has each of the sequential rotational orientations, illuminating the specimen 130 with the incident x-ray beam 124 and collecting fluorescence x-rays generated by the specimen 130 in response to the incident x-ray beam 124. In certain such implementations, the sequential rotational orientations comprise at least three rotational orientations and/or the sequential rotational orientations have a total summed rotation of the specimen 130 of at least 90 degrees (e.g., at least 180 degrees).

In certain implementations, the method 200 comprises performing the operational blocks 210-250 multiple times to collect fluorescence x-rays from a first location of the specimen 130 while the specimen 130 has multiple rotational orientations relative to the incident x-ray beam 124. The method 200 of certain implementations can further comprise, after performing the operational blocks 210-250 multiple times at the first location, moving (e.g., laterally) the specimen 130 such that the incident x-ray beam 1245 impinges a second location of the specimen 130 and performing the operational blocks 210-250 multiple times again while the incident x-ray beam 124 impinges the second location. In certain implementations, the movement of the specimen 130 can be performed as a sequential series of steps in two directions in a plane substantially parallel to a surface of the specimen 130 (e.g., performing a two-dimensional raster scan of the specimen 130 in the x-y plane).

As shown in FIG. 4B, in an operational block 310, the method 300 comprises irradiating the specimen 130 with an incident x-ray beam 124 at a first plurality of locations while the specimen 130 has a first rotational orientation relative to the incident x-ray beam 124. As schematically illustrated by the top panel of FIG. 4C, the incident x-ray beam 124 impinges the specimen 130 at a near grazing incident angle $\theta$ (e.g., $\theta=3$ degrees relative to a surface of the specimen 130) and propagates along the x-direction. Due to the near grazing incident angle, the incident x-ray beam 124 irradiates a region of the specimen 130 having a footprint (e.g., corresponding to the focal spot of the incident x-ray beam 124 at the specimen 130) that is elongated (e.g., stretched) by a factor of $1/\sin(\theta)$ along the x-direction (e.g., the region irradiated by the incident x-ray beam 124 has a width d and a length $d/\sin(\theta)$). As schematically illustrated by the left lower panel of FIG. 4C, these elongated regions are denoted by rectangles having their long dimensions (e.g., lengths) aligned along the x-direction. The elongation of the regions irradiated by the incident x-ray beam 124 can reduce the number of scan points along the direction by $\sin(\theta)$.

In certain implementations, the first plurality of locations is irradiated by the incident x-ray beam 124 by moving (e.g., laterally) the specimen 130 in a sequential series of steps in two directions in a plane substantially parallel to a surface of the specimen 130 (e.g., performing a two-dimensional raster scan of the specimen 130 in the x-y plane) while the specimen 130 is at the first rotational orientation relative to the incident x-ray beam 124. In this way, the specimen 130 can be moved such that the incident x-ray beam 124 impinges each location of the first plurality of locations.

The top panel of FIG. 4C schematically illustrates a side view (e.g., a view along the y-direction) of the incident x-ray beam 124 and the specimen 130 in an $n^{th}$ scanning position relative to one another (e.g., such that the incident x-ray beam 124 irradiates an $n^{th}$ location of the first plurality of locations) and in an $(n+1)^{th}$ scanning position relative to one another (e.g., such that the incident x-ray beam 124 irradiates an $(n+1)^{th}$ location of the first plurality of locations). In certain implementations, the step sizes in the x-direction and/or in the y-direction are selected such that the irradiated elongated regions border one another (e.g., as schematically illustrated in the top panel of FIG. 4C), while in certain other implementations, the step sizes in the x-direction and/or the y-direction are selected such that the irradiated elongated regions overlap one another by a predetermined amount. The left lower panel of FIG. 4C schematically illustrates a top view (e.g., along the z-direction that is perpendicular to the specimen surface) of the specimen 130, with each rectangular region representing a corresponding elongated region being irradiated by the incident x-ray beam 124 at the first plurality of locations.

In an operational block 320, the method 300 further comprises detecting fluorescence x-rays from the first plurality of locations, the fluorescence x-rays generated in response to the irradiation of the specimen 130 at the first plurality of locations by the incident x-ray beam 124. For example, the detector 140 can be configured to record Fe fluorescence x-rays as a function of the position of the specimen 130 relative to the incident x-ray beam 124. The detected fluorescence x-rays from a single location of the first plurality of locations corresponds to a single data point. In certain implementations, the fluorescence x-rays are detected by the detector 140 positioned as schematically illustrated by FIG. 3B.

In an operational block 330, the method 300 further comprises, after irradiating the specimen 130 at the first plurality of locations in the operational block 310 and detecting the fluorescence x-rays from the first plurality of locations in the operational block 320, rotating the specimen 130 about a direction substantially perpendicular to a surface of the specimen 130 (e.g., about the z-direction) such that the specimen has a second rotational orientation relative to the incident x-ray beam 124, the second rotational orientation different from the first rotational orientation by an angle $\Delta\omega$. For example, the angle $\Delta\omega$ can be approximately equal to one-half the ratio of a beam width d of the incident x-ray beam 124 and a beam length $d/\sin(\theta)$ of the incident x-ray beam 124 (e.g., $\Delta\omega=d/(2d/\sin(\theta))=\sin(\theta/2)$).

In an operational block 340, the method 300 further comprises, after rotating the specimen 130 in the operational block 330, irradiating the specimen 130 with the incident x-ray beam 124 at a second plurality of locations while the specimen 130 has the second rotational orientation relative to the incident x-ray beam 124. In certain implementations, the second plurality of locations is the same as the first plurality of locations, but locations are irradiated by the incident x-ray beam 124 while the specimen 130 is at a different rotational angle. At each of the locations of the second plurality of locations, the incident x-ray beam 124 again irradiates an elongated region of the specimen 130 having a footprint (e.g., corresponding to the focal spot of the incident x-ray beam 124 at the specimen 130), but the region is elongated (e.g., stretched) by a factor of $1/\sin(\theta)$ along the x'-direction. The right lower panel of FIG. 4B schematically illustrates the specimen 130 with the first plurality of locations and the regions elongated along the x-direction rotated to have the second rotational orientation, but does not show the regions elongated along the x'-direction for clarity.

In certain implementations, the second plurality of locations is irradiated by the incident x-ray beam 124 by moving the specimen 130 in a sequential series of steps in two directions in a plane substantially parallel to a surface of the specimen 130 (e.g., performing a two-dimensional raster scan of the specimen 130 in the x'-y' plane) while the specimen 130 is at the second rotational orientation relative to the incident x-ray beam 124. In this way, the specimen 130 can be moved such that the incident x-ray beam 124 impinges each location of the second plurality of locations. In certain other implementations, irradiating the second plurality of locations comprises moving the incident x-ray beam 124 relative to the specimen 130 in a sequential series of steps with corresponding movements of the position of the detector 140 (e.g., to maintain the relative position of the detector 140 to the irradiated portion of the specimen 130).

In an operational block 350, the method 300 further comprises detecting fluorescence x-rays from the second plurality of locations, the fluorescence x-rays generated in response to the irradiation of the specimen 130 at the second plurality of locations by the incident x-ray beam 124. For example, the detector 140 can be configured to record Fe fluorescence x-rays as a function of the position of the specimen 130 relative to the incident x-ray beam 124. The detected fluorescence x-rays from a single location of the second plurality of locations corresponds to a single data point. In certain implementations, the fluorescence x-rays are detected by the detector 140 positioned as schematically illustrated by FIG. 3B.

In certain implementations, the operational blocks 340 and 350 are repeated (e.g., the 2D raster scanning data collection is repeated) until the total accumulated angle of the Aw specimen rotations reaches 180 degrees ($\pi$ in radians). The total number of rotations is thus equal to $180°/\Delta\omega=2\pi/(\sin(\theta))$. In certain implementations, the fluorescence x-ray signal is collected continuously while the specimen 130 is being scanned. In certain implementations, the method 200 and/or the method 300 is used to optimize data collection efficiency by avoiding the overhead associated with point-by-point data collection of conventional methods.

In certain implementations, the method 200 and/or the method 300 further comprises energy-resolving the fluorescence x-rays that are collected while the specimen 130 has the first rotational orientation and energy-resolving the fluorescence x-rays that are collected while the specimen 130 has the second rotational orientation. In certain implementations, the method 200 and/or the method 300 further comprises energy-resolving the fluorescence x-rays that are collected while the specimen 130 has each of the sequential rotational orientations. In certain implementations, the method 200 and/or the method 300 further comprises energy-resolving the fluorescence x-rays that are collected while the first plurality of locations are irradiated and energy-resolving the fluorescence x-rays that are collected while the second plurality of locations are illuminated.

Figure 5:
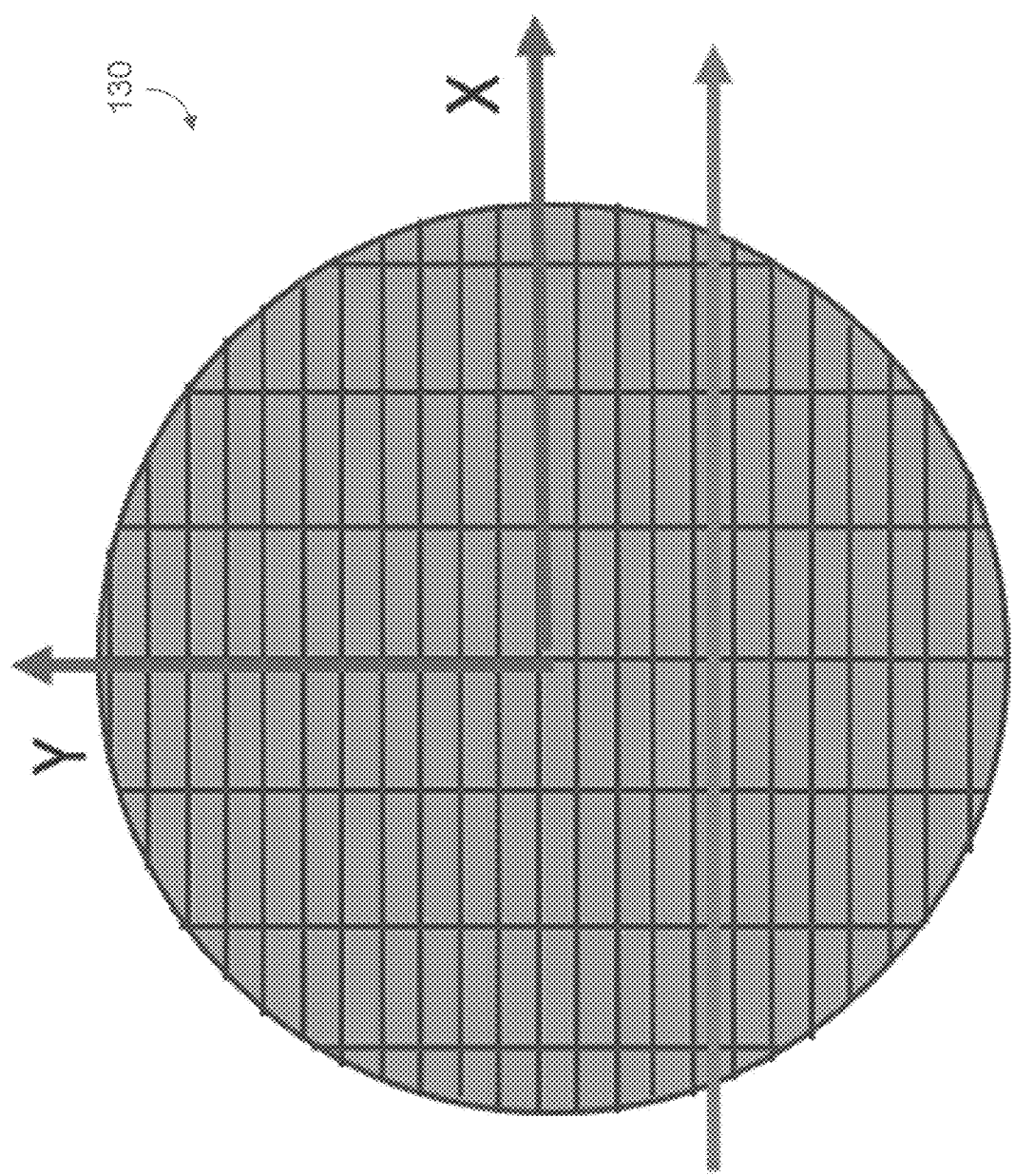
FIG. 5 schematically illustrates the total accumulated x-ray fluorescence signal along the x-ray beam path in accordance with certain implementations described herein.

In certain implementations, the method 200 and/or the method 300 further comprises reconstruction of the collected x-ray fluorescence data (e.g., as collected in the operational blocks 220, 250, 320, and 350) to generate a two-dimensional image of trace element distribution Fe distribution) in the specimen 130 (see, e.g., "X-Ray Microscopy" by Chris Jacobsen, including Section 8.5.2 (Cambridge University Press, 2019)). Such reconstruction can be performed in a manner analogous to image reconstruction of a single slice in conventional absorption CT reconstruction. For example, as schematically illustrated by FIG. 5, the total accumulated x-ray fluorescence signal along the x-ray beam path (e.g., as marked by the lower horizontal arrow in FIG. 5) is treated as being distributed equally to all the pixels along the x-ray beam path. With this equivalence, many image reconstruction techniques developed for CT, such as SIRT algorithm, can be adapted and optimized for use in certain implementations described herein. In certain implementations, the reconstruction using the fluorescence x-ray data collected at various rotational orientations of the specimen 130 relative to the incident near-grazing incident x-ray beam 124 is configured to recover the spatial (e.g., lateral) resolution that is otherwise lost due to the near-grazing angle of incidence and the concomitant increase of the spot size (e.g., by (e.g., by a factor of $1/\sin\theta$) from the near-grazing angle of incidence. For example, the reconstruction can comprise triangulating the signal generation spot by combining the data at different rotational angles, thereby improving the spatial resolution.

Figure 6A:
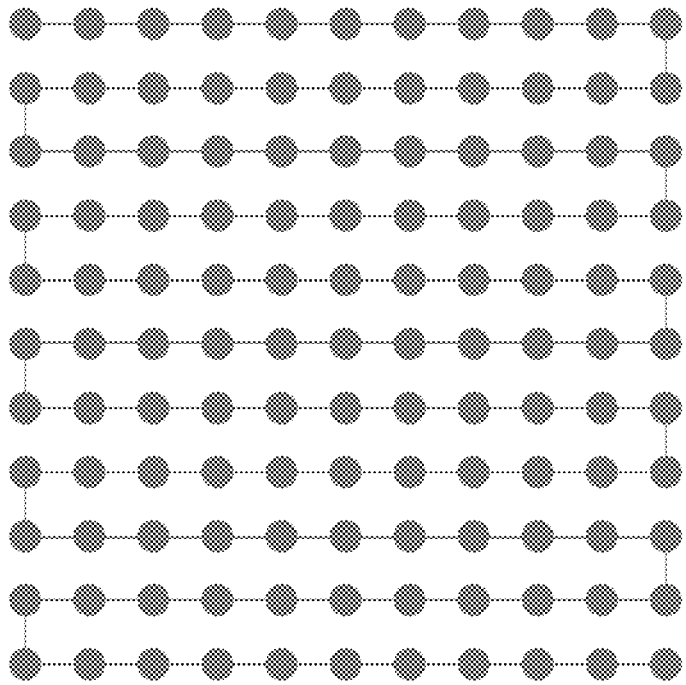
FIG. 6A schematically illustrates two examples of a "step-by-step scan" mode of data acquisition in accordance with certain implementations described herein.
Figure 6A:
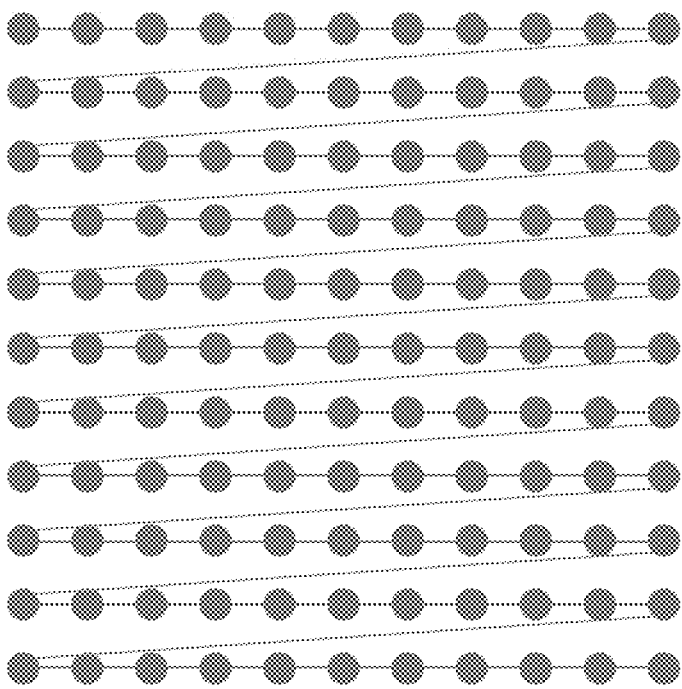
Figure 6B:
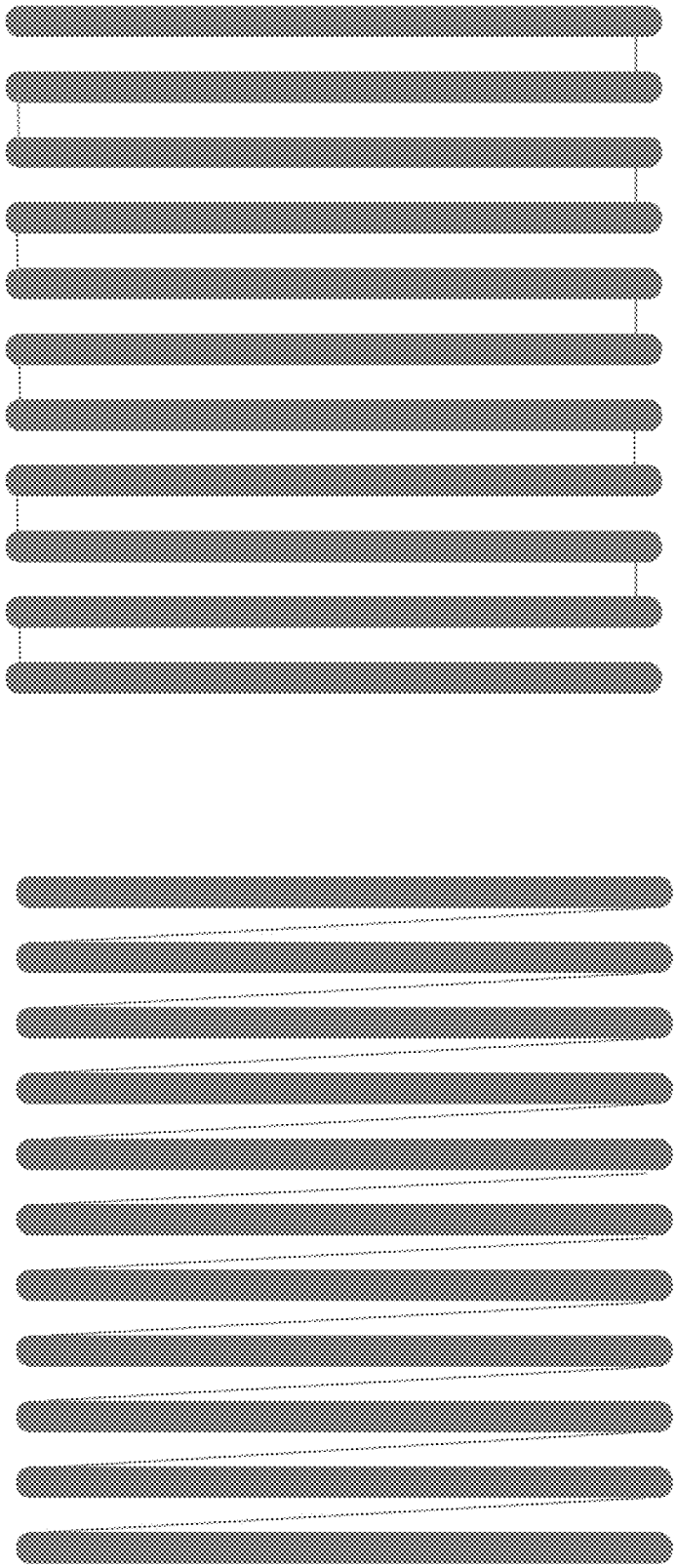
FIG. 6B schematically illustrates two examples of a "fly scan" mode of data acquisition in accordance with certain implementations described herein.
Figure 6C:
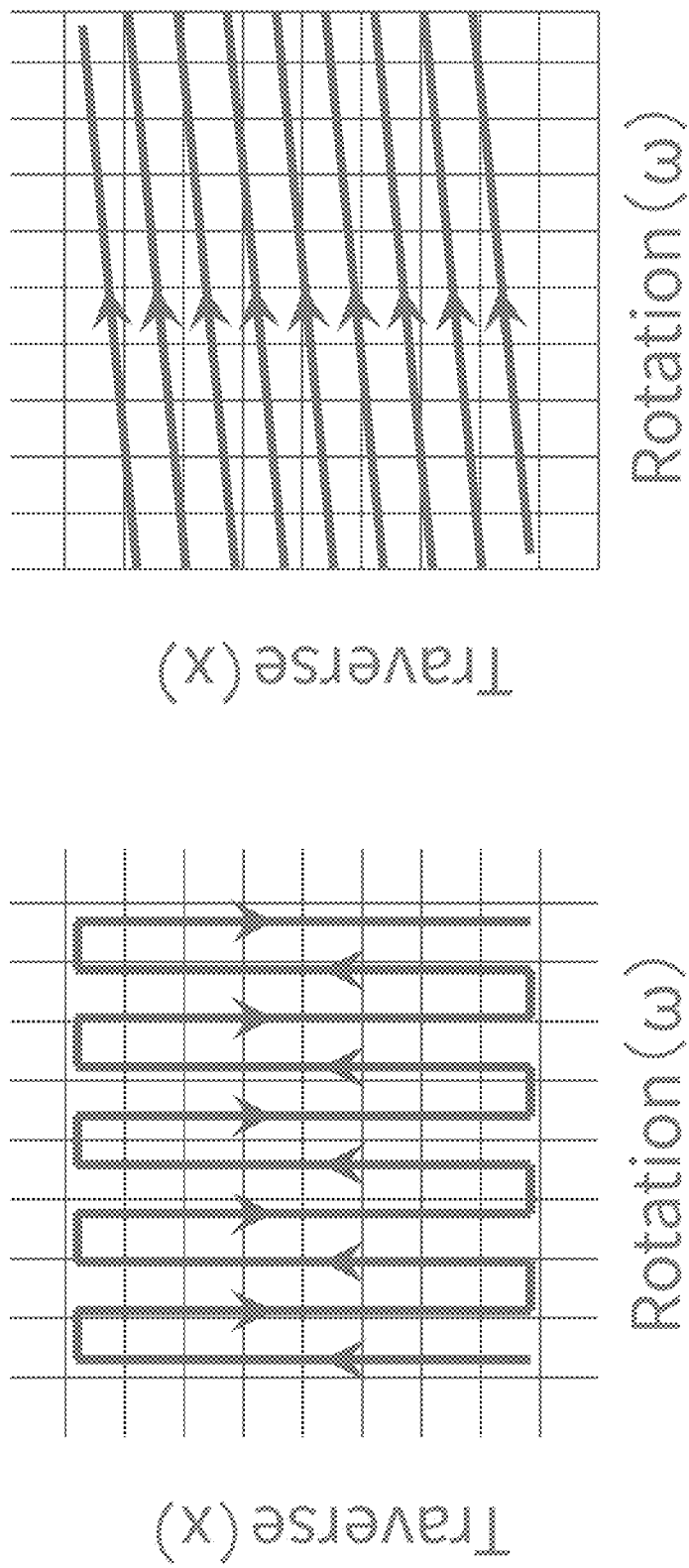
FIG. 6C schematically illustrates two examples of a "traverse-and-rotate scan" mode of data acquisition in accordance with certain implementations described herein.

FIGS. 6A-6C schematically illustrates various example scan modes compatible with certain implementations described herein. FIG. 6A schematically illustrates two examples of a "step-by-step scan" mode of data acquisition in accordance with certain implementations described herein. In this scan mode, a plurality of step-by-step scans of the specimen 130 in the lateral plane (e.g., substantially parallel to the specimen surface) is performed and the specimen 130 is rotated (e.g., about an axis substantially perpendicular to the specimen surface) after each raster scan. In certain such implementations, a step-acquire-step scan can be used in which the data acquisition is paused while each step is performed (e.g., data acquisition is performed while the specimen is stationary) to acquire good statistics for the fluorescence x-ray data. As shown in FIG. 6A, the step-by-step scan can be a raster scan (left panel) or the step-by-step scan can be serpentine (right panel).

FIG. 6B schematically illustrates two examples of a "fly scan" mode of data acquisition in accordance with certain implementations described herein. In this scan mode, the data is continuously acquired (e.g., without pausing; with a large field of view) while moving the specimen 130 relative to the incident x-ray beam 124. As shown in FIG. 6B, the fly scan can be a raster scan (left panel) or the fly scan can be serpentine (right panel).

FIG. 6C schematically illustrates two examples of a "traverse-and-rotate scan" mode of data acquisition in accordance with certain implementations described herein. This scan mode can be fast and used with small field of view for small regions of the specimen 130 that are of interest, and an optical microscope can be used for rough alignment and to find the regions of interest. In this scan mode, the incident x-ray beam 124 traverses the specimen 130 and the specimen 130 is simultaneously rotated to acquire a small dataset, with either continuous or interwoven steps.

XRF Signal

In certain implementations, the at least one detector 140 is configured to detect the x-ray fluorescence signal emitted by the specimen 130 and the strength of the x-ray fluorescence signal can be estimated. For example, the x-ray fluorescence signal ($F_i$) of Fe detected can be expressed approximately by:

$$F_i = F * \sigma * N * \frac{\Omega}{4\pi} * \zeta$$

where F is the incident x-ray flux, $\sigma$ is the x-ray fluorescence cross section of Fe at 8 keV, N is the number of Fe atoms in the illuminated volume of the specimen 130 (e.g., a brain specimen), $\Omega$ is the solid angle of the at least one detector 140 in steradians, and $\xi$ is a parameter that takes into account losses (e.g., attenuation of the focused x-ray beam 124 inside the specimen 130, attenuation of the Fe fluorescence x-rays from the production point within the specimen 130 to the detector 140, and detector detection efficiency). This parameter $\xi$ can be approximated to be 1 for imaging Fe in thin brain sections because these losses are small due to the negligible absorption of fluorescence x-rays by the low-Z elements of the specimen 130 and because the SSD detection efficiency for Fe K-line fluorescence x-rays is close to 100%.

The incident focused x-ray flux F is the product of the x-ray source brightness B (e.g., the number of x-rays per unit area and per unit solid angle illuminating the specimen 130), the square of the phase space of the focused x-ray beam 124, which is equal to the product of the focus spot size L and two times of the numerical aperture NA (the collection solid angle) of the x-ray optical subsystem 120:

$$F = 0.5 * B * \pi * \left(\frac{L}{2}\right)^2 * \pi * NA^2$$

where the factor of 0.5 accounts for the loss due to the use of a central beam stop on the two paraboloidal mirrors 122 to remove unreflected x-rays. Using the values of $B=1.3\times 10^{10}/s/mrad^2/mm^2$ for the x-ray source 110, L=30 microns, and NA=14 milliradians, the incident focused x-ray flux F equals $2.8\times 10^9$ x-rays/s/(30 µm)$^2$.

The number N of Fe atoms in the illuminated volume of the specimen 130 is approximately equal to the product of the mean concentration of Fe of about 2 ppm ($2*10^{-6}$) and the total number of atoms in the illuminated volume by the focused x-ray beam 124, which is approximately equal to $10^{11}*\pi*(L/2)^2)*t/\sin(3°)$, where $10^{11}$ is the number of atoms per µm$^3$ (e.g., assuming that each atom occupies 10 Å$^3$ volume, and t is the thickness of the specimen 130 is in µm). For t=40 microns, the number of Fe atoms N can be estimated to be equal to $1.1\times 10^{11}$. Using the calculated values for F and N above, $\sigma=7.39*10^{-21}$ cm$^2$ for the Fe fluorescence cross section at 8 keV, and $\Omega=1.2$ (10% of $4\pi$) steradian, the ray fluorescence signal of Fe detected by the energy dispersive detector 140 can be estimated to be $F_i=2.4\times 10^4$/s for a 40-micron-thick brain tissue specimen 130 with 1 ppm of Fe concentration with a 30 µm focused beam size.

For a 5 millisecond acquisition time, about 900 Fe Ka fluorescence x-rays (Fi) can be detected, giving a precision of 2.5% ($\sqrt{counts}$/counts) which is sufficient for quantification of Fe. Using 5 ms per acquisition point, the total collection time can be estimated to be the product of the total number of acquisition points for each rotation, the number of rotations, and the acquisition time, resulting in $250*13*125*5$ ms=$2.0\times 10^3$ seconds, or 0.56 hours (33.6 minutes).

In certain implementations, the system 100 advantageously provides greater than 75% of the 180× XRF data collection speed (e.g., signal rate) gain with a 3-degree incidence angle as compared to a 90-degree incidence angle. For example, conventional systems can measure single atomic layer of Co films on a silicon wafer with a 30 µm focus and measurement precision better than 1.4% in 250 seconds, collecting about 30 Co fluorescence x-rays per second. In certain implementations described herein, the example system 100 can achieve a Co fluorescence count rate that is increased by 180× to $5.4*10^3$/s by changing the incidence angle from 90 degrees to 3 degrees. Note that the Co fluorescence count rate is only a factor 2 lower than the estimated Fe fluorescence count to be achieved with the example system 100 in accordance with certain implementations described herein.

FIG. 7 schematically illustrates a side view and a top view of an example model specimen 400 (e.g., phantom) simulating a 40 µm section of brain tissue with about 2 ppm relative concentration of a trace element in accordance with certain implementations described herein. The diameter of the patterned area of the example model specimen 400 is 1.5 centimeters. The model specimen 400 can be fabricated by depositing approximately one atomic thick of Fe though a 20 µm thick polyimide onto a 40 µm thick polyimide stretched over a plastic washer with an opening diameter of about 10 mm. The patterned Fe layer can be sandwiched between the two polyimide layers. A sputtering system with established thickness calibration procedure can be used to deposit the Fe layer. The relative concentration of the Fe in the two polyimide layers can be approximately equal to about 4 ppm (about 1.5 Å/40 µm). The model specimen 400 can be used to measure and collect Fe XRF signal from the model specimen 400 at two incidence angles (e.g., 3 degrees and 90 degrees) for demonstrating the XRF rate gain.

Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A method for using x-ray fluorescence to analyze a specimen, the method comprising:
    illuminating a specimen with an incident x-ray beam while the specimen has a first rotational orientation relative to the incident x-ray beam, the incident x-ray beam having a near-grazing incident angle relative to a surface of the specimen, the near-grazing incident angle in a range of 1 degree to 15 degrees relative to the surface of the specimen;
    collecting fluorescence x-rays generated by the specimen in response to the incident x-ray beam while the specimen has the first rotational orientation;
    rotating the specimen about a direction substantially perpendicular to the surface of the specimen such that the specimen has a second rotational orientation relative to the incident x-ray beam, the second rotational orientation different from the first rotational orientation by a rotation angle;
    illuminating the specimen with the incident x-ray beam while the specimen has the second rotational orientation; and
    collecting fluorescence x-rays generated by the specimen in response to the incident x-ray beam while the specimen has the second rotational orientation.

2. The method of claim 1, wherein the near-grazing incident angle is greater than a critical angle of the specimen.

3. The method of claim 1, wherein said illuminating a specimen with an incident x-ray beam while the specimen has a first rotational orientation comprises focusing the incident x-ray beam at the specimen with a spot size that is less than or equal to 50 microns in at least one direction substantially parallel to the surface of the specimen, and said illuminating the specimen with the incident x-ray beam while the specimen has the second rotational orientation comprises focusing the incident x-ray beam at the specimen with a spot size that is less than or equal to 50 microns in at least one direction substantially parallel to the surface of the specimen.

4. The method of claim 1, further comprising:
    energy-resolving the fluorescence x-rays collected while the specimen has the first rotational orientation; and
    energy-resolving the fluorescence x-rays collected while the specimen has the second rotational orientation.

5. The method of claim 1, wherein the rotation angle is in a range between $0.5*\sin(\theta)$ and $\sin(\theta)$, where $\theta$ is the near-grazing incident angle.

6. The method of claim 1, further comprising:
    rotating the specimen about the direction substantially perpendicular to the surface of the specimen such that the specimen has a plurality of sequential rotational orientations relative to the incident x-ray beam, the sequential rotational orientations of the plurality of sequential rotational orientations different from one another by the rotation angle; and
    while the specimen has each sequential rotational orientation of the plurality of sequential rotational orientations, illuminating the specimen with the incident x-ray beam and collecting fluorescence x-rays generated by the specimen in response to the incident x-ray beam.

7. The method of claim 6, further comprising energy-resolving the fluorescence x-rays that are collected while the specimen has each sequential rotational orientation of the plurality of sequential rotational orientations.

8. The method of claim 6, wherein the plurality of sequential rotational orientations comprises at least three sequential rotational orientations.

9. The method of claim 6, wherein the plurality of sequential rotational orientations has a total summed rotation of the specimen of at least 180 degrees.

10. The method of claim 1, wherein said illuminating the specimen with the incident x-ray beam while the specimen has the first rotational orientation relative to the incident x-ray beam comprises illuminating the specimen with the incident x-ray beam at a first plurality of locations, and said illuminating the specimen with the incident x-ray beam while the specimen has the second rotational orientation relative to the incident x-ray beam comprises illuminating the specimen with the incident x-ray beam at a second plurality of locations.

11. The method of claim 10, wherein said illuminating the specimen with the incident x-ray beam at the first plurality of locations comprises moving the specimen in a sequential series of steps in two directions in a plane substantially parallel to the surface of the specimen such that the incident x-ray beam impinges each location of the first plurality of locations while the specimen has the first rotational orientation relative to the incident x-ray beam, and said illuminating the specimen with the incident x-ray beam at the second plurality of locations comprises moving the specimen in a sequential series of steps in two directions in the plane substantially parallel to the surface of the specimen such that the incident x-ray beam impinges each location of the second plurality of locations while the specimen has the second rotational orientation relative to the incident x-ray beam.

12. The method of claim 1, wherein said illuminating the specimen with the incident x-ray beam while the specimen has the first rotational orientation relative to the incident x-ray beam comprises illuminating the specimen with the incident x-ray beam at a first location, and said illuminating the specimen with the incident x-ray beam while the specimen has the second rotational orientation relative to the incident x-ray beam comprises illuminating the specimen with the incident x-ray beam at the first location.

13. The method of claim 12, further comprising:
    translating the specimen in a plane substantially parallel to the surface of the specimen such that the incident x-ray beam impinges a second location different from the first location;

illuminating the specimen with the incident x-ray beam at the second location with the specimen having the first rotational orientation relative to the incident x-ray beam;
collecting fluorescence x-rays generated by the specimen in response to the incident x-ray beam while the specimen is at the second location with the first rotational orientation relative to the incident x-ray beam;
illuminating the specimen with the incident x-ray beam at the second location with the specimen having the second rotational orientation relative to the incident x-ray beam; and
collecting fluorescence x-rays generated by the specimen in response to the incident x-ray beam while the specimen is at the second location with the second rotational orientation relative to the incident x-ray beam.

14. The method of claim 1, further comprising:
generating data indicative of the fluorescence x-rays collected at multiple rotational orientations; and
reconstructing the data to generate a two-dimensional image of a distribution of a trace element in the specimen.

15. A system for x-ray fluorescence analysis of a specimen, the system comprising:
an x-ray source configured to generate x-rays;
an x-ray optical subsystem configured to receive the x-rays from the x-ray source and to direct at least some of the received x-rays as an x-ray beam to illuminate a specimen, the x-ray beam having a near-grazing incident angle relative to a surface of the specimen, the near-grazing incident angle is in a range of 1 degree to 15 degrees relative to the surface of the specimen;
a specimen stage configured to support the specimen and to move the specimen in a plane parallel to the surface of the specimen and to rotate the specimen around a direction perpendicular to the surface of the specimen; and
at least one energy-discriminating detector configured to measure at least some fluorescence x-rays emitted from the surface of the specimen in response to the x-ray beam.

16. The system of claim 15, wherein the near-grazing incident angle is greater than a critical angle of the specimen.

17. The system of claim 15, wherein the x-ray optical subsystem comprises at least one x-ray reflector having a quadric reflecting surface profile.

18. The system of claim 17, wherein the at least one x-ray reflector comprises a pair of paraboloidal x-ray optics configured to receive the x-rays from the x-ray source and to focus at least some of the x-rays into the x-ray beam with a focal spot in or on the specimen.

19. The system of claim 15, wherein the x-ray optical subsystem has a working distance greater than or equal to 15 millimeters.

20. The system of claim 15, wherein the specimen stage is configured to rotate the specimen by at least 90 degrees.

21. The system of claim 15, wherein the at least one energy-discriminating detector comprises an active element positioned substantially parallel to the surface of the specimen.

22. The system of claim 15, wherein the x-ray source comprises a plurality of target materials configured to generate x-rays in response to electron bombardment, the generated x-rays of the plurality of target materials having corresponding spectral characteristics.

* * * * *